(12) United States Patent
Blanksby et al.

(10) Patent No.: US 10,148,460 B2
(45) Date of Patent: *Dec. 4, 2018

(54) PACKET EXTENSION FOR WIRELESS COMMUNICATION

(71) Applicant: Avago Technologies International Sales Pte. Limited, Singapore (SG)

(72) Inventors: Andrew Blanksby, Lake Oswego, OR (US); Matthias Korb, Mission Viejo, CA (US); Ron Porat, San Diego, CA (US); Dignus-Jan Moelker, Voorhout (NL)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,245

(22) Filed: Dec. 27, 2017

(65) Prior Publication Data

US 2018/0123832 A1 May 3, 2018

Related U.S. Application Data

(63) Continuation of application No. 15/013,653, filed on Feb. 2, 2016, now Pat. No. 9,860,082.

(60) Provisional application No. 62/287,325, filed on Jan. 26, 2016, provisional application No. 62/277,741, filed on Jan. 12, 2016, provisional application No. 62/216,127, filed on Sep. 9, 2015, provisional application No. 62/187,733, filed on Jul. 1, 2015, provisional application No. 62/183,545, filed on Jun. 23, 2015, provisional application No. 62/172,753, filed on Jun. 8, 2015, provisional application No.

(Continued)

(51) Int. Cl.
| | |
|---|---|
| *H04W 4/00* | (2018.01) |
| *H04L 12/64* | (2006.01) |
| *H04L 12/00* | (2006.01) |
| *H04L 1/00* | (2006.01) |
| *H04L 29/06* | (2006.01) |

(52) U.S. Cl.
CPC ............ *H04L 12/6418* (2013.01); *H04L 1/00* (2013.01); *H04L 1/0083* (2013.01); *H04L 12/00* (2013.01); *H04L 69/22* (2013.01)

(58) Field of Classification Search
CPC .................................................. H04L 12/6418
USPC ......................................................... 370/329
See application file for complete search history.

(56) References Cited

U.S. PATENT DOCUMENTS

| | | |
|---|---|---|
| 7,239,648 B1 | 7/2007 | Feng et al. |
| 9,860,082 B2 * | 1/2018 | Blanksby .................. H04L 1/00 |

(Continued)

*Primary Examiner* — Christopher R Crompton
(74) *Attorney, Agent, or Firm* — Sterne, Kessler, Goldstein & Fox P.L.L.C.

(57) ABSTRACT

Methods, systems, and apparatuses are described for providing device(s) with additional processing time to process a packet received wirelessly while still meeting the legacy SIFS time constraint. The additional processing time may be achieved by adding, by a device transmitting the packet, padding and/or a packet extension to the last symbol of the packet. The additional processing time provided to the device(s) advantageously reduces the amount of extra hardware that would normally be added to meet the SIFS time constraint. The amount of padding and/or packet extension to be added to the last symbol is balanced to minimize the complexity of the device(s) against the reduction in system efficiency incurred by the device(s).

20 Claims, 15 Drawing Sheets

Related U.S. Application Data

62/158,433, filed on May 7, 2015, provisional application No. 62/129,003, filed on Mar. 5, 2015, provisional application No. 62/111,378, filed on Feb. 3, 2015.

(56) References Cited

U.S. PATENT DOCUMENTS

| | | |
|---|---|---|
| 2006/0036923 A1 | 2/2006 | Hedberg et al. |
| 2011/0261742 A1 | 10/2011 | Wentink |
| 2013/0301551 A1 | 11/2013 | Ghosh et al. |
| 2015/0365263 A1* | 12/2015 | Zhang .................. H04L 1/0057 375/295 |
| 2016/0143030 A1 | 5/2016 | Lee et al. |
| 2016/0227437 A1 | 8/2016 | Blanksby et al. |

* cited by examiner

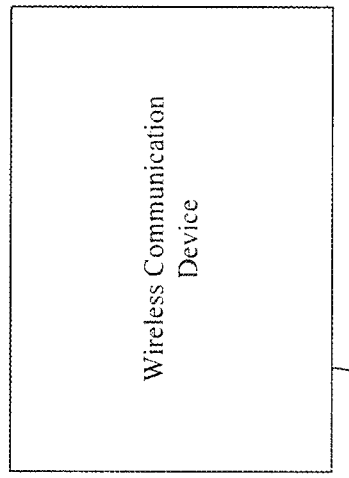
FIG. 2
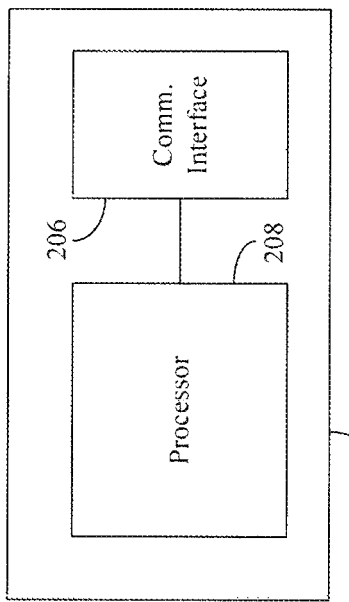
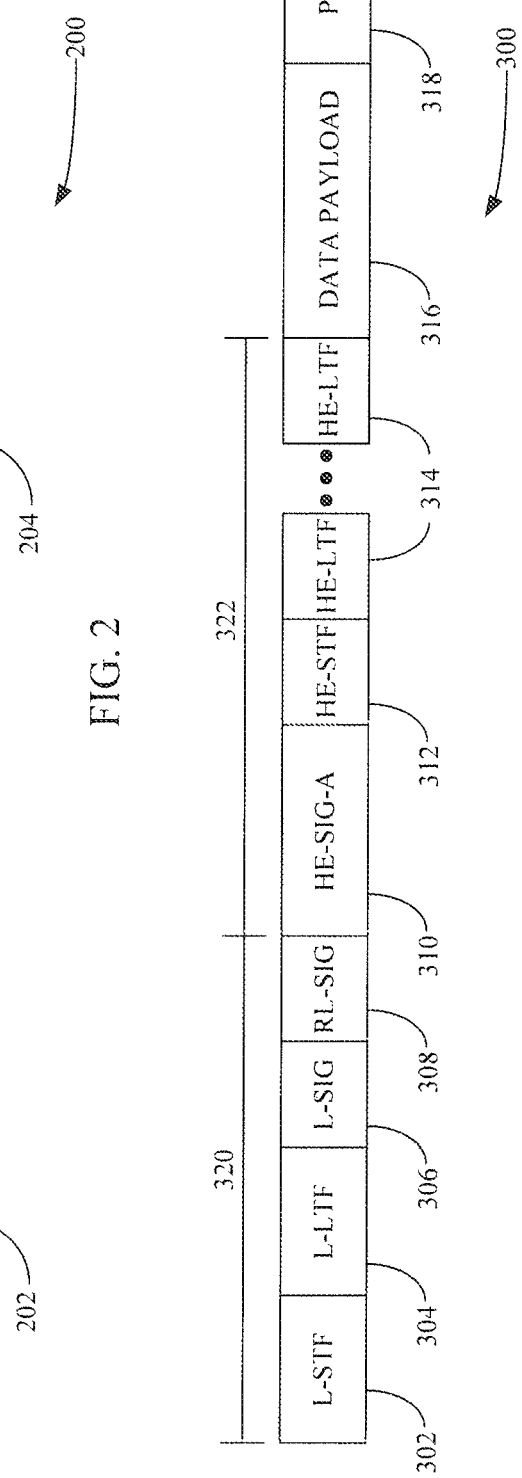
FIG. 3

| RU Size | Number of Data Subcarriers Per Short Symbol |
|---|---|
| 26 | 6 |
| 52 | 12 |
| 106 | 24 |
| 242 | 60 |
| 484 | 120 |
| 996 | 240 |
| 996x2 | 492 |

| Segment Boundary Parameter Value | HE-SIG-A Encoding |
|---|---|
| 1 | 01 |
| 2 | 10 |
| 3 | 11 |
| 4 | 00 |

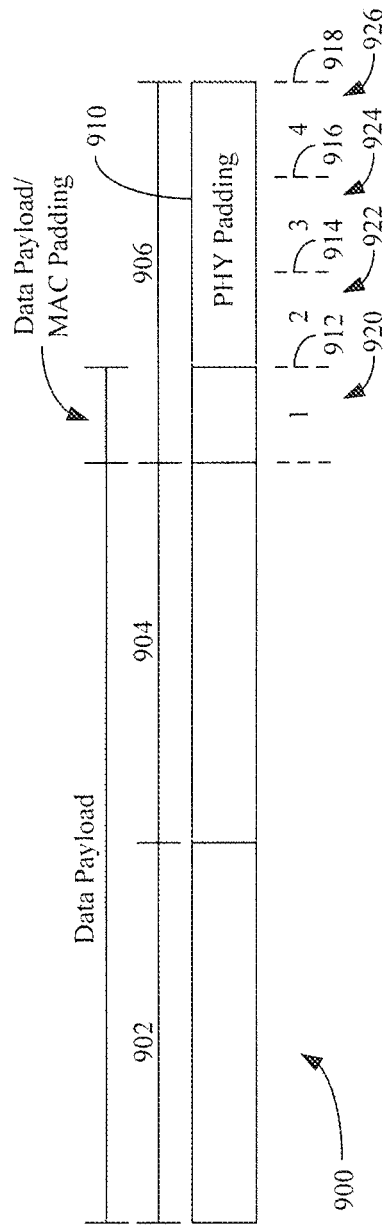
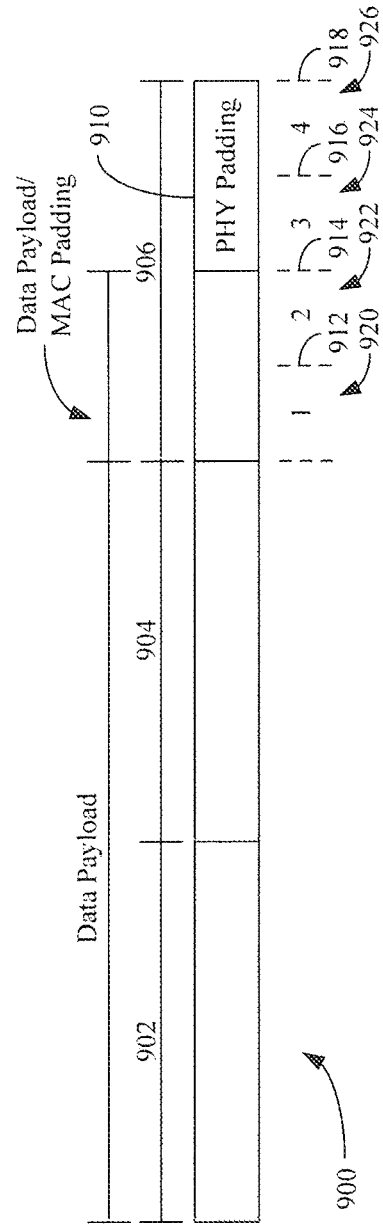
FIG. 9A
FIG. 9B

| Range of $N_{avbits}$ | $N_{CW}$ | Codeword Length $L_{LDPC}$ |
|---|---|---|
| $N_{avbits} <= 648$ | 1 | 1296 if $N_{avbits} >= N_{pld} + 912(1-R)$ else 648 |
| $648 < N_{avbits} <= 1296$ | 1 | 1944 if $N_{avbits} >= N_{pld} + 1464(1-R)$ else 1296 |
| $1296 < N_{avbits} <= 1944$ | 1 | 1944 |
| $1944 < N_{avbits} <= 2592$ | 2 | 1944 if $N_{avbits} >= N_{pld} + 2916(1-R)$ else 1296 |
| $2592 < N_{avbits}$ | $\left\lceil \dfrac{N_{pld}}{1944 \cdot R} \right\rceil$ | 1944 |

| $a_{init}$ | $a$ | $N_{SYM}$ |
|---|---|---|
| 1 | 2 | $N_{SYM} = N_{SYM\,init}$ |
| 2 | 3 | $N_{SYM} = N_{SYM\,init}$ |
| 3 | 4 | $N_{SYM} = N_{SYM\,init}$ |
| 4 | 1 | $N_{SYM} = N_{SYM\,init} + m_{STBC}$ |

| $a_{max\ init}$ | $N_{pld,u}$ |
|---|---|
| 1 | $(N_{SYM\ max\ init} - m_{STBC}) \cdot N_{DBPS,u} + N_{DBPS\_SHORT,u}$ |
| 2 | $(N_{SYM\ max\ init} - m_{STBC}) \cdot N_{DBPS,u} + 2 \cdot N_{DBPS\_SHORT,u}$ |
| 3 | $(N_{SYM\ max\ init} - m_{STBC}) \cdot N_{DBPS,u} + 3 \cdot N_{DBPS\_SHORT,u}$ |
| 4 | $N_{SYM\ max\ init} \cdot N_{DBPS,u}$ |

| $a$ | $N_{pld,u}$ |
|---|---|
| 1 | $(N_{SYM} - m_{STBC}) \cdot N_{DBPS,u} + N_{DBPS\_SHORT,u}$ |
| 2 | $(N_{SYM} - m_{STBC}) \cdot N_{DBPS,u} + 2 \cdot N_{DBPS\_SHORT,u}$ |
| 3 | $(N_{SYM} - m_{STBC}) \cdot N_{DBPS,u} + 3 \cdot N_{DBPS\_SHORT,u}$ |
| 4 | $N_{SYM} \cdot N_{DBPS,u}$ |

PACKET EXTENSION FOR WIRELESS COMMUNICATION

CROSS REFERENCE TO RELATED APPLICATION

This application is a continuation of U.S. patent application Ser. No. 15/013,653, filed Feb. 2, 2016, which claims the benefit of U.S. Provisional Application Ser. No. 62/111,378, filed Feb. 3, 2015, U.S. Provisional Application Ser. No. 62/129,003, filed Mar. 5, 2015, U.S. Provisional Application Ser. No. 62/158,433, filed May 7, 2015, U.S. Provisional Application Ser. No. 62/172,753, filed Jun. 8, 2015, U.S. Provisional Application Ser. No. 62/183,545, filed Jun. 23, 2015, U.S. Provisional Application Ser. No. 62/187,733, filed Jul. 1, 2015, U.S. Provisional Application Ser. No. 62/216,127, filed Sep. 9, 2015, U.S. Provisional Application Ser. No. 62/277,741, filed Jan. 12, 2016, and U.S. Provisional Application Ser. No. 62/287,325, filed Jan. 26, 2016, the entireties of all of which are incorporated by reference herein.

BACKGROUND

Technical Field

The subject matter described herein relates to the processing of packets received in accordance with wireless communication protocol(s).

Description of Related Art

Wi-Fi is a trade name owned by an international trade organization known as the Wi-Fi Alliance. The organization promotes and certifies that submitted products comply with the group's very specific standards. More technically, Wi-Fi is based on specifications developed by the Institute of Electrical and Electronic Engineers (IEEE). The term Wi-Fi specifically refers to IEEE 802.11 technology and the two tetins are sometimes used interchangeably.

Though 802.11 is the overall specification for Wi-Fi, it has many subdivisions that specify requirements such as quality of service or security. Each subdivision is designated by a lower case letter following the 802.11 designation. There are several core technology subdivisions that are frequently seen when referring to generational improvements in Wi-H technology.

802.11b operates on the 2.4 GHz frequency band. It has a maximum bandwidth of 11 Mbps and is the slowest Wi-Fi standard. It is also the most susceptible to interference. In its favor, it has much longer range than 802.11a. It was popular when first released because it was less expensive than 802.11a.

802.11a is much faster than the 802.11b standard, transferring up to 54 Mbps. It is also much less sensitive to interference from other wireless devices and appliances. On the downside, it has shorter range than the 802.11b standard. This made it more expensive primarily because it required more access points to cover a given distance.

802.11g was successful at combining the best features of the Wi-Fi 802.11a and 802.11b standards. It utilizes the 2.4 GHz band, but can also achieve data transfer speeds of 54 Mbps. The signal range is good and is not as easily obstructed by obstacles as 802.11a. Operating in the 2.4 GHz range, however, could still result in some interference from other devices.

802.11n (or 802.11an for clients that support both 802.11a and 802.11n) represents a major improvement over all of its predecessors. Using multiple wireless signals and antennas, its MIMO (Multiple Input Multiple Out) technology, increases data transfer speed up to 450 Mbps under ideal circumstances, greatly increases range, and reduces dead spots that were characteristic of prior versions.

802.11ac provides greater performance than 802.11n, with first-generation products operational at up to 1.3 Gbps maximum data rates, or about three times faster than the maximum 450 Mbps data rate of today's 802.11n products. 802.11ac operates only in the 5 GHz unlicensed spectrum, whereas 802.11n operates in both the 2.4 GHz and 5 GHz spectrums.

802.11ax is the successor to 802.11ac and is expected to increase the efficiency of wireless LAN (WLAN) networks. The Orthogonal Frequency Division Multiplexing (OFDM) symbol size is increased to be four times that over 802.11an and 802.11ac. Thus, 802.11ax may require four times the amount of frequency and bit domain processing per symbol than compared to 802.11an and 802.11ac. The throughput is approximately the same as 802.11an and 802.11ac.

However, the Short Interframe Space (SIFS) (i.e., the amount of time required for a wireless device to process a received packet and send an acknowledgment to a wireless device that transmits the packet) of 802.11ax is the same as that of 802.11an and 802.11ac. A receiver operating in accordance with 802.11ax will need to process four times the data in the final OFDM symbol in the same amount of time as in 802.11ac and 802.11an.

Moreover, the physical (PHY) layer of the receiver has potentially four times the frequency and bit domain processing requirements to meet the SIFS time, which requires additional hardware or faster hardware to perform Fast Fourier Transforms (FFTs), demodulation and error correction coding (e.g., low-density parity-check (LDPC) coding).

BRIEF SUMMARY

Methods, systems, and apparatuses are described for the processing of packets received in accordance with a wireless communication protocol, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 2 is a block diagram of a system for providing a packet extension for a packet to be transmitted to a single wireless communication device in accordance with an embodiment.

FIG. 3 is a block diagram illustrating the contents of an example 802.11ax PPDU packet in accordance with an embodiment.

FIGS. 9A-9D show block diagrams of a portion of a PPDU packet to be transmitted to a wireless communication device for which it is determined that a maximum packet extension duration of 8 µs is supported in accordance with one or more embodiments.

FIG. 16 shows a table for determining a number of payload bits per user in accordance with an embodiment.

FIG. 17 shows a table for determining a number of payload bits per user in accordance with another embodiment.

Figure 1:
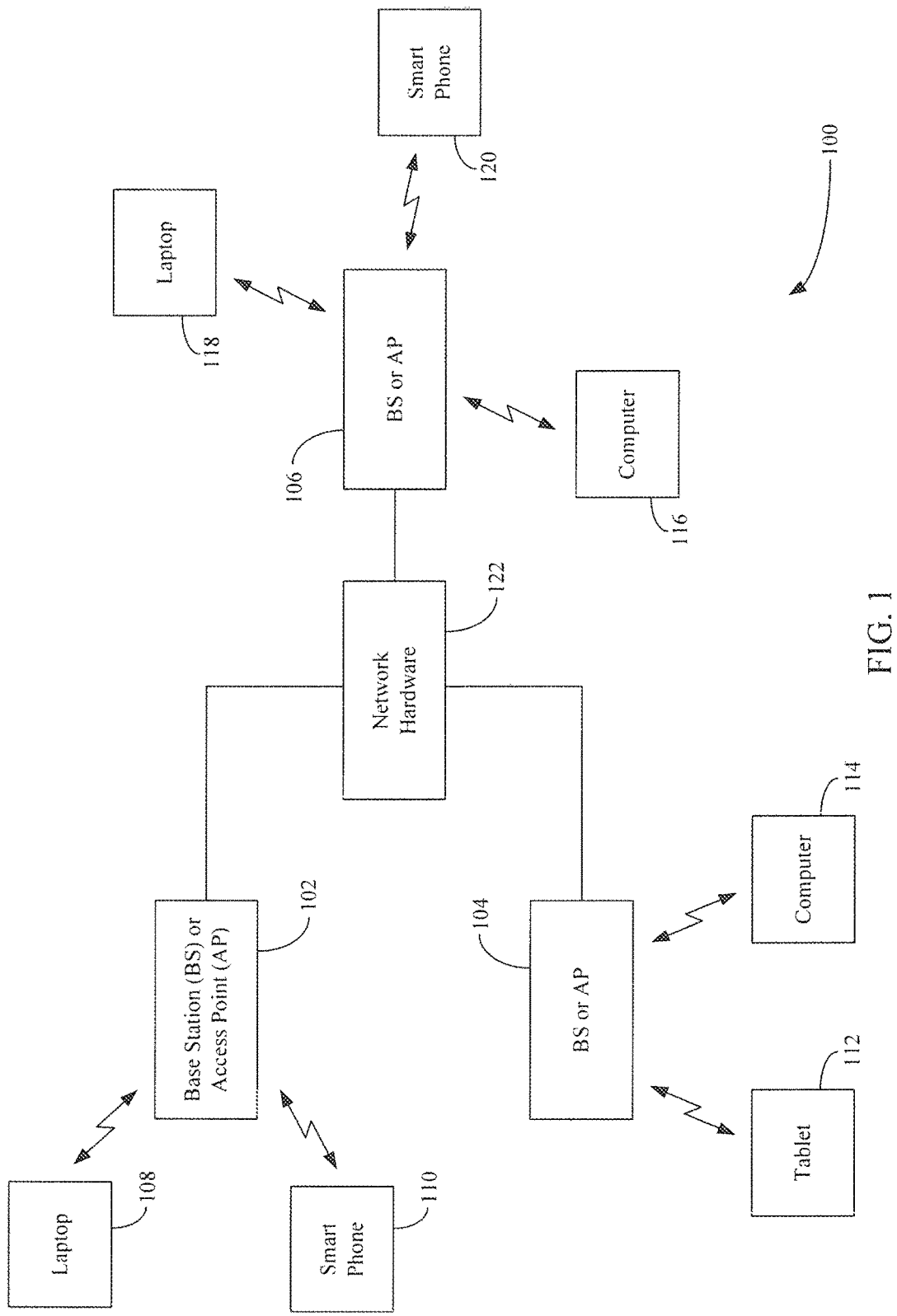
FIG. 1 is a block diagram of a wireless communication system m accordance with an embodiment

Embodiments will now be described with reference to the accompanying drawings.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

In particular, a method performed by a transmitter is described. In accordance with the method, one or more first capabilities of at least a first receiver are determined. A segment boundary parameter is determined that indicates a number of short symbol segments, which are included in a final symbol of a frame to be transmitted to at least the first receiver, that include a combination of at least one of data payload and a first type of padding. A first duration of a first packet extension to be added to the end of the frame is determined based on the determined one or more first capabilities and the determined segment boundary parameter.

A system is also described herein. The system comprises one or more processing units and a memory coupled to the one or more processing units, the memory storing instructions, which, when executed by the one or more processing units, are configured to perform operations. In accordance with the operations, one or more first capabilities of at least a first receiver are determined. A segment boundary parameter is determined that indicates a number of short symbol segments, which are included in a final symbol of a frame to be transmitted to at least the first receiver, that include a combination of at least one of data payload and a first type of padding. A first duration of a first packet extension to be added to the end of the frame is determined based on the determined one or more first capabilities and the determined segment boundary parameter.

A computer-readable storage medium having program instructions recorded thereon that, when executed by a processing device, perform a method for determining a duration for a packet extension. In accordance with the method, one or more first capabilities of at least a first receiver are determined. A segment boundary parameter is determined that indicates a number of short symbol segments, which are included in a final symbol of a frame to be transmitted to at least the first receiver, that include a combination of at least one of data payload and a first type of padding. A first duration of a first packet extension to be added to the end of the frame is determined based on the determined one or more first capabilities and the determined segment boundary parameter.

II. Packet Extension for Wireless Communication

Techniques described herein provide device(s) with additional processing time to process a packet received wirelessly while still meeting the legacy SIPS time constraint. The additional processing time may be achieved by adding, by a device transmitting the packet, padding and/or a packet extension to the last symbol of the packet. The additional processing time provided to the device(s) advantageously reduces the amount of extra hardware that would normally be added to meet the SIFS time constraint. The amount of padding and/or packet extension to be added to the last symbol is balanced to minimize the complexity of the device(s) against the reduction in system efficiency incurred by the device(s).

FIG. 1 is a block diagram of a wireless communication system 100 in accordance with an embodiment. As shown in FIG. 1, wireless communication system 100 includes a base station (BS) and/or access point (AP) 102, a BS or AP 104, a BS or AP 106, a wireless communication device 108, a wireless communication device 110, a wireless communication device 112, a wireless communication device 114, a wireless communication device 116, a wireless communication device 118, a wireless communication device 120, and a network hardware component 122. Each of BS or APs 102, 104, and 106 and network hardware component 122 may be a computing device, including a desktop computer, a mobile computer or computer device (e.g., a laptop computer, a notebook computer, a tablet computer, a smart phone), an access point, a router, a modem, or any other device capable of transmitting and/or receiving data in accordance with any of the wireless protocols described above. Each of wireless communication devices 108, 110, 112, 114, 116, 118, and 120 may be referred to as a station (or "STA").

As shown in FIG. 1, wireless communication device 108 is a first laptop, wireless communication device 110 is a first smart phone, wireless communication device 112 is a tablet, wireless communication device 114 is a first computer, wireless communication device 116 is a second computer, wireless communication device 118 is a second laptop, and wireless communication device 120 is a second smart phone. The depiction of these particular wireless communication devices is merely for illustrative purposes. Each of wireless communication devices 108, 110, 112, 114, 116, 118, and 120 may be any wireless communication device capable of transmitting and/or receiving data in accordance with any of the wireless protocols described above. It is also noted that the number of base stations or access points (i.e., BS or AP 102, BS or AP 104, and BS or AP 106) and/or number of wireless communication devices (i.e. wireless communication devices 108, 110, 112, 114, 116, 118, and 120) shown in FIG. 1 are purely exemplary and that any number of base stations or access points and/or wireless communication devices may be included in system 100.

Each of BS or APs 102, 104, and 106 may be operably coupled to network hardware component 122 via a wired or wireless connection. Examples of network hardware component 122 include, but are not limited to, a router, switch, bridge, modem, system controller, and/or the like. Each of BS or AP 102, BS or AP 104, and BS or AP 106 has one or more antennas for communication with one or more wireless communication devices in its area. For example, as shown in FIG. 1, BS or AP 102 is configured to wirelessly communicate with wireless communication devices 108 and 110, BS or AP 104 is configured to wirelessly communicate with wireless communication devices 112 and 114, and BS or AP 106 is configured to wirelessly communicate with wireless communication devices 116, 118, and 120.

Each of BS or APs 102, 104 and 106 and/or wireless communication devices 108, 110, 112, 114, 116, 118, and 120 may be configured to transit and/or receive one or packets (also referred to as "frame(s)") in accordance with one or more wireless protocols. Examples of wireless protocols include IEEE 802.11ax (also known as a High Efficiency (HE) protocol), IEEE 802.11an (also known as a High Throughput (HT) protocol), IEEE 802.11ac (also known as a Very High Throughput (VHT) protocol), etc.

When transmitting packets using the IEEE 802.11ax protocol, each of BS or APs 102, 104 and 106 may provide additional processing time for wireless communication device(s) 108, 110, 112, 114, 116, 118, and 120 to process a packet received from BS or AP(s) 102, 104 and/or 106 while still meeting the legacy SIFS time constraint. The additional processing time may be achieved by adding, by the BS or AP transmitting the packet (i.e., BS or AP 102, 104, or 106), padding (e.g., physical layer (PHY) padding) and/or a packet extension to the last symbol of the packet. The amount of PHY padding to be added may depend on a number of short symbol segments that comprise the final symbol that include data payload and/or media access layer (MAC) padding. The duration of the packet extension to be added may depend on one or more capabilities of the wireless communication device to which the packet is being sent. The wireless communication device receiving the packet may infer the data payload length and the duration of the packet extension of the packet based at least on a segment boundary parameter determined and provided by the transmitting BS or AP, which indicates the number of short symbol segments in a final symbol of the packet that include the data payload and/or MAC padding.

Packet transmission from a BS or AP to a wireless communication device may be referred to as a downlink (DL) transmission, and packet transmission from a wireless communication device to a BS or AP may be referred to as an uplink (UL) transmission.

The following subsections describe various embodiments. In particular, Subsection A describes embodiments directed to providing a packet extension for a DL packet using a single-user (SU) transmission scheme, where a BS or AP transmits a packet to a single wireless communication device. Subsection B describes embodiments directed to providing a packet extension for a DL packet using a multi-user (MU) transmission scheme, where a BS or AP transmits a packet to a plurality of wireless communication devices. Subsection C describes various embodiments directed to UL transmissions.

A. Single-User Transmission Schemes

FIG. 2 is a block diagram of a system 200 for providing a packet extension for a packet to be transmitted to a single wireless communication device 204 in accordance with an embodiment. As shown in FIG. 2, system 200 includes a BS or AP 202 and wireless communication device 204. BS or AP 202 may be an example of any of BS or APs 102, 104, and 106, and wireless communication device 204 may be an example of any of wireless communication devices 108, 110, 112, 114, 116, 118, and 120, as described above in reference to FIG. 1.

BS or AP 202 may include a communication interface 206 and a processor 208. Communication interface 206 may be configured to transmit and/or and receive packet(s) to and/or from wireless communication device 204. Processor 208 may be configured to perform various operations including generating, formatting, and/or encoding packet(s) for transmission by communication interface 206 and/or decoding packet(s) received from wireless communication device 204 via communication interface 206. When transmitting a packet using the IEEE 802.11ax protocol, processor 208 may be further configured to add one or more types of padding to the data payload included in the packet and/or a packet extension to the packet. Communication interface 206 may comprise one or more antennas.

A packet (or "frame") transmitted by BS or AP 202 and/or received by wireless communication device 204 may be an orthogonal frequency-division multiple access (OFDMA)

packet. Processor 208 may allocate a particular number of resource units (RUs) (e.g., sub-carriers or tones) for each OFDM symbol. The number of resource units allocated may be dependent on the bandwidth at which BS or AP 202 transmits a packet. Examples of a packet include, but are not limited to a physical layer convergence procedure (PLCP) protocol data unit (PPDU), a Null Data Packet (NDP), etc.

For example, FIG. 3 shows an example 802.11ax PPDU packet 300 in accordance with an embodiment. As shown in FIG. 3, PPDU packet 300 may include a legacy preamble 320, an HE preamble 322, a data payload field 316 and/or a packet extension (PE) 318. Legacy preamble 320 and/or HE preamble 322 may be collectively referred to as the header of PPDU packet 300. Legacy preamble 320 may include a non-HT (i.e., a legacy) short training field (L-STF) 302, a non-HT long training field (L-LTF) 304, a non-HT SIGNAL field (L-SIG) 306, and a repeated non-HT SIGNAL field (RL-SIG) 308. L-STF 302 may be used by legacy (i.e., non-802.11ax compatible) wireless communication devices for frame timing acquisition, automatic gain control (AGC) convergence, and/or course frequency acquisition. L-LTF 304 may be used by legacy wireless communication devices for frequency offset and channel estimation. L-SIG 306 and/or RL-SIG 308 may include control information utilized by legacy wireless communication devices for demodulating and decoding data payload included in data payload field 316. As will be described below L-SIG 306 may also include a LENGTH field that specifies the length of transmission for PPDU packet 300. This ensures that legacy devices respect the total packet duration, and therefore, prevents legacy devices from interfering with another device's transmission. HE preamble 322 may include an HE Signal A Field (HE-SIG-A) 310, an HE short training, field (HE-STF) 312, and one or more HE long training fields (HE-LTF) 314. HE-SIG-A 310 may include control information utilized by wireless communication device 204 for demodulating and decoding data payload included in data payload field 316. For example, as will be described below, HE-SIG-A 310 may include a segment boundary parameter that indicates a number of short symbol segments (that are included in a final symbol of PPDU packet 300) that includes a combination of at least one of data payload and a first type of padding (e.g., MAC padding). HE-SIG-A may also include a low density parity check (LDPC) parameter that indicates whether LDPC was used when encoding PPDU packet 300. When LDPC is used, an extra symbol (e.g., an LDPC symbol) of parity bits is sometimes added as part of the data payload. HE-STF 312 may be used by wireless communication device 204 for frame timing acquisition, AGC convergence, and/or course frequency acquisition. HE-LTF(s) 314 may be used by wireless communication device 204 for frequency offset and channel estimation. Data payload field 316 may comprise one or more symbols (e.g., OFDMA symbols) of data. The data may include tail bits, which are used to terminate a trellis of a convolutional decoder (e.g., implemented by a processor (not shown) of wireless communication device 204), service bits (e.g., which may be a bit sequence used for initializing a scrambler (e.g., implemented by a processor (not shown) of wireless communication device 204)), and other known types of bits (e.g., excess bits). PE 318 may provide wireless communication device 204 additional processing time to process PPDU packet 300 so that the legacy SIFS time constraint is met. PE 318 may vary from packet to packet and its duration may depend on the segment boundary parameter and/or one or more capabilities of wireless communication device 204.

Figures 4, 5, 6:
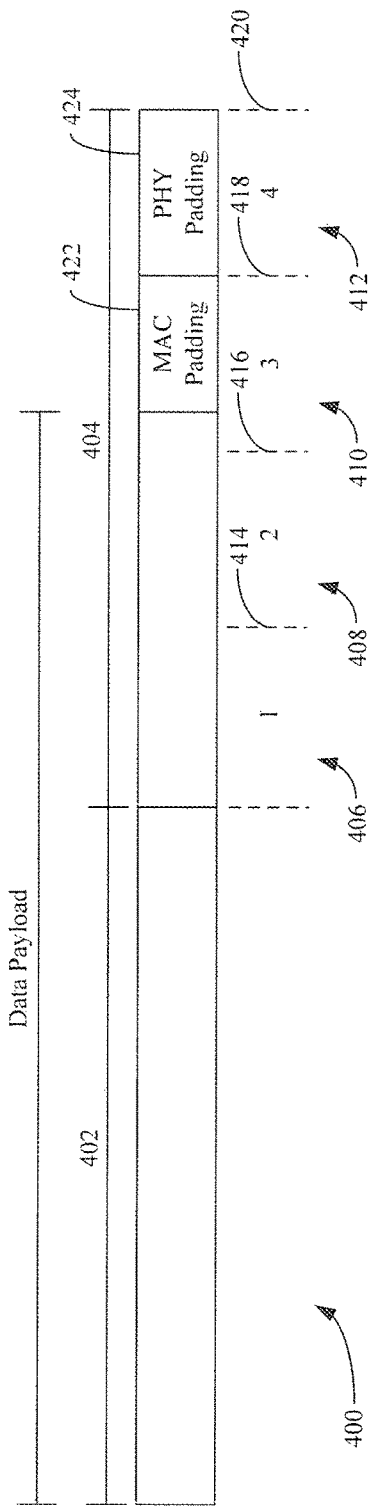
FIG. 4 is a block diagram of a portion of a PPDU packet in accordance with an embodiment.
FIG. 5 shows a table illustrating a two-bit encoding used for a segment boundary parameter in accordance with an embodiment.
FIG. 6 shows a table illustrating a number of resource units allocated for each of a first three short symbol segments for a given total number of resource units allocated for a whole OFDM symbol in accordance with an embodiment.

The process in which processor 208 determines the segment boundary parameter will now be described with reference to FIG. 4. FIG. 4 is a block diagram of a portion of a PPDU packet 400 in accordance with an embodiment. In particular, PPDU packet 400 shows a portion of a data payload field (e.g., data payload field 316, as shown in FIG. 3) for sake of brevity. As shown in FIG. 4, PPDU packet 400 comprises a first OFDM symbol 402 and a second OFDM symbol 404. Second OFDM symbol 404 is the final symbol of the data payload field of PPDU packet 400. As further shown in FIG. 4, first OFDM symbol 402 fully comprises data payload, and second OFDM symbol 404 partially includes data payload. Processor 208 may determine the segment boundary parameter by segmenting the final symbol (i.e., second OFDM symbol 404) into a plurality of short symbol segments (e.g., a first short symbol segment 406, a second short symbol segment 408, a third short symbol segment 410, and a fourth short symbol segment 412). First segment boundary 414 represents the end of first short symbol segment 406 and the beginning of second short symbol segment 408, second segment boundary 416 represents the end of second short symbol segment 408 and the beginning of third short symbol segment 410, third segment boundary 418 represents the end of third short symbol segment 410 and the beginning of fourth short symbol segment 412, and fourth segment boundary 420 represents the end of fourth short symbol segment 412 (and the end of second OFDM symbol 404).

Processor 208 may determine the last short symbol segment of the plurality of short symbol segments that includes data payload. For example, with reference to FIG. 4, processor 208 may determine that third short symbol segment 410 is the last short symbol segment to include data payload. Thereafter, processor 208 may add a first type of padding to the determined short symbol segment up to the next segment boundary. For example, with reference to FIG. 4, processor 208 determines that third short symbol segment 410 is the last short symbol segment to include data payload and appends the first type of padding (e.g., MAC padding 422) to the data payload up to the next segment boundary (i.e., third segment boundary 418). Processor 208 may add a second type of padding to the remaining short symbol segments. For example, with reference to FIG. 4, processor 208 pads fourth short symbol segment 412 with PHY padding 424. It is noted that the first type of padding may not be needed in situations in which the data payload included in the final symbol ends at a segment boundary. The segment boundary parameter may correspond to the number of short symbol segments that include a combination of at least one of data payload and the first type of padding (i.e., the boundary parameter at which the data payload and/or the first type of padding end within the final symbol of the PPDU packet). For example, with reference to FIG. 4, the segment boundary parameter may indicate that third segment boundary 418 is the segment boundary at which the data payload and/or MAC padding 422 ends and that the number of short symbol segments that includes a combination of at least one of data payload and MAC padding 422 is three (i.e., first short symbol segment 406, second short symbol segment 408, and third short symbol segment 410). In accordance with an, embodiment, MAC padding 422 is pre-forward error correction (FEC) padding, and PHY padding 424 is post-FEC padding.

The post-FEC padding sequence should have a good peak to average power ratio (PAPP). In accordance with an embodiment, the post-FEC padding sequence is a 127 length sequence. In accordance with such an embodiment, the post-FEC padding sequence is the following:

Post-FEC Sequence={00001110 11110010 11001001
00000010 00100110 00101110 10110110
00001100 11010100 11100111 10110100
00101010 11111010 01010001 10111000
1111111}  (Equation 1)

It is noted that the sequence of Equation 1 is the same scrambling sequence used for OFDM modulation. It has been observed that this scrambling sequence has a good PAPR, for post-FEC padding sequences. In accordance with one or more embodiments, only the portion of the sequence of Equation 1 needed to fill the post-FEC padding requirement of a given frame is used. If necessary, the sequence of Equation 1 is repeated. In accordance with one or more embodiments in which BS or AP 202 is performing a multi-user (MU) transmission (i.e., BS or AP 202 is transmitting a packet to multiple wireless communication devices), a different seed (i.e., initialization value) should be used for each wireless communication device, as using the same seed for each wireless communication device results in bad PAPR.

As described above, the determined segment boundary parameter may be provided in the header of the PPDU packet being provided to wireless communication device 204. In particular, the segment boundary parameter may be provided in a two-bit field of the HE-SIG-A field (i.e., HE-SIG-A field 310, as shown in FIG. 3). FIG. 5 shows a table illustrating, the two-bit encoding used for the determined segment boundary parameter in accordance with an embodiment. For example, as shown in FIG. 5, if processor 208 determines that the determined segment boundary is the first segment boundary (i.e., first segment boundary 414, as shown in FIG. 4), the two-bit value used in the HE-SIG-A field is '01.' If processor 208 determines that the determined segment boundary is the second segment boundary (i.e., second segment boundary 416, as shown in FIG. 4), the two-bit value used in the HE-SIG-A field is '10.' If processor 208 determines that the determined segment boundary is the third segment boundary (i.e., third segment boundary 418, as shown in FIG. 4), the two-bit Value used in the HE-SIG-A field is '11.' If processor 208 determines that the determined segment boundary is the fourth segment boundary (i.e., fourth segment boundary 420, as shown in FIG. 4), the two-bit value used in the HE-SIG-A field is '00.'

In accordance with an embodiment, the number of short symbol segments in which the final symbol of a PPDU packet is segmented is approximately four equal short symbol segments (i.e., each short symbol segment is approximately a quarter symbol). FIG. 6 shows a table illustrating the number of data subcarriers allocated for each of the first three short symbol segments for a given resource unit size allocated for a whole OFDM symbol in accordance with an embodiment. The number of data subcarriers allocated for the final (or fourth) short symbol segment may be determined by subtracting the sum of the data subcarriers allocated for the first three short symbol segments from the given total number of data subcarriers allocated for the whole OFDM symbol. For example, with reference to FIG. 6, if resource unit size 26 is allocated for a whole OFDM symbol, 6 data subcarriers are allocated for each of the first three short symbol segments, and 8 (i.e., 26-18) data subcarriers are allocated for the fourth and final short symbol segment. If resource unit size 52 is allocated for a whole OFDM symbol, 12 data subcarriers are allocated for each of the first three short symbol segments, and 16 (i.e., 52-36) data subcarriers are allocated for the fourth and final short symbol segment. If resource unit size 106 is allocated for a whole OFDM symbol, 24 data subcarriers are allocated for each of the first three short symbol segments, and 34 (i.e., 106-72) data subcarriers are allocated for the fourth and final short symbol segment. If resource unit size 242 is allocated for a whole OFDM symbol, 60 data subcarriers are allocated for each of the first three short symbol segments, and 62 (i.e., 242-180) data subcarriers are allocated for the fourth and final short symbol segment. If resource unit size 484 is allocated for a whole OFDM symbol, 120 data subcarriers are allocated for each of the first three short symbol segments, and 124 (i.e., 484-360) data subcarriers are allocated for the fourth and final short symbol segment. If resource unit size 996 is allocated for a whole OFDM symbol, 240 data subcarriers are allocated for each of the first three short symbol segments, and 276 (i.e., 996-720) data subcarriers are allocated for the fourth and final short symbol segment. If resource unit size 996×2 is allocated for a whole OFDM symbol, 492 data subcarriers are allocated for each of the first three short symbol segments, and 516 (i.e., (996×2)-1476) data subcarriers are allocated for the fourth and final short symbol segment.

Figures 7, 8:
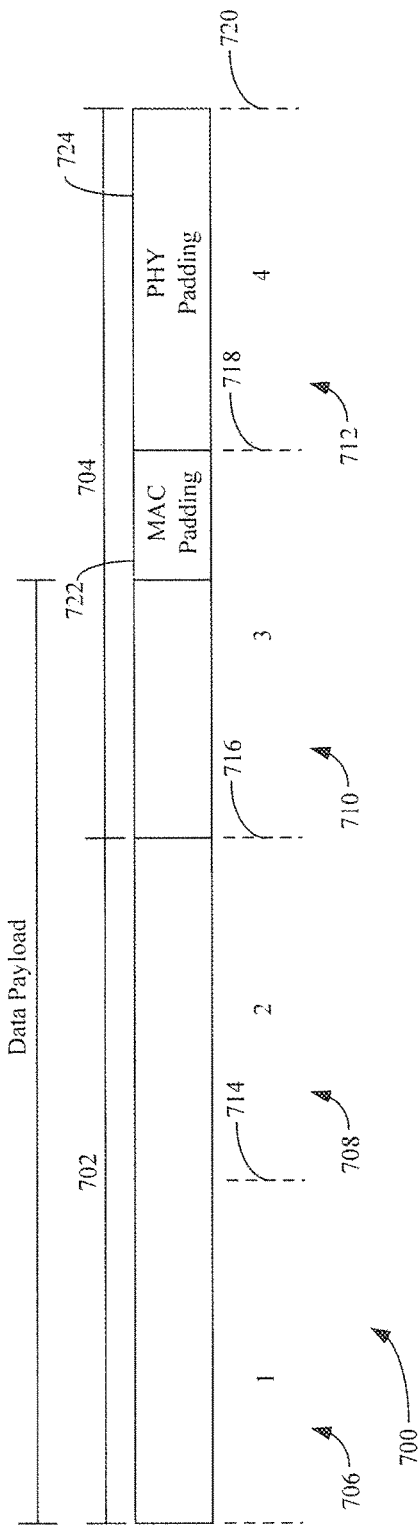
FIG. 7 is a block diagram of a portion of a PPDU packet to be transmitted using Space Time Block Coding (STBC) in accordance with an embodiment.
FIG. 8 shows a table illustrating an example three-bit encoding used for constellation thresholds in accordance with an embodiment.

In accordance with an embodiment in which processor 208 uses Space-Time Block Coding (STBC) to transmit a packet, the final two symbols of the packet are divided into four segments and MAC padding is performed up to the next segment boundary (if needed). PHY padding may be performed for the remainder of the final two symbols. For example, FIG. 7 is a block diagram of a portion of a PPDU packet 700 to be transmitted using STBC in accordance with an embodiment. In particular, PPDU packet 700 shows a portion of a data payload field (e.g., data payload field 316, as shown in FIG. 3) for sake of brevity. As shown in FIG. 7, PPDU packet 700 comprises a first OFDM symbol 702 and a second OFDM symbol 704. First OFDM symbol 702 and second OFDM symbol 704 are the final two symbols of the data payload field of PPDU packet 700. As further shown in FIG. 7, first OFDM symbol 702 fully comprises data payload, and second OFDM symbol 704 partially includes data payload. Processor 208 may determine the segment boundary parameter by segmenting the final two symbols (i.e., first second OFDM symbol 702 and second OFDM symbol 704) into four short symbol segments (e.g., a First short symbol segment 706, a second short symbol segment 708, a third short symbol segment 710, and a fourth short symbol segment 712).

Processor 208 may determine the last short symbol segment of the plurality of short symbol segments that includes data payload. For example, with reference to FIG. 7, processor 208 may determine that third short symbol segment 710 is the last short symbol segment to include data payload. Thereafter, processor 208 may add a first type of padding to the determined short symbol segment up to the next segment boundary. For example, with reference to FIG. 7, processor 208 determines that third short symbol segment 710 is the last symbol segment to include data payload and appends the first type of padding (e.g., MAC padding 722) to the data payload up to the next segment boundary (i.e., third segment boundary 718). Processor 208 may add a second type of padding to the remaining symbol segments. For example, with reference to FIG. 7, processor 208 pads fourth short symbol segment 712 with PHY padding 724. It is noted that the first type of padding may not be needed in situations in, which the data payload included in the final symbol ends at a segment boundary. The segment boundary parameter may correspond to the number of short symbol segments that include a combination of at least one of data payload and the first type of padding (i.e., the boundary parameter at which the data payload and/or the first type of padding end within the final symbol of the PPDU packet). For example, with reference to FIG. 7, the segment boundary parameter may indicate that third segment boundary 718 is the segment boundary at which the data payload and/or MAC padding 722 ends and that the number of short symbol segments that includes a combination of at least one of data payload and MAC padding 722 is three (i.e., first short symbol segment 706, second short symbol segment 708, and third short symbol segment 710).

As described above, processor 208 may determine the duration of packet extension to be added to the end of a packet based on the segment boundary parameter and one or more capabilities of wireless communication device 204. The one or more capabilities of wireless communication device 204 may be determined during an association process between BS or AP 202 and wireless communication device 204. The association process enables BS or AP 202 and wireless communication device 204 to allocate resources and synchronize with each other. Wireless communication device 204 may begin the association process by sending an association request to BS or AP 202. The association request may advertise one or more capabilities of wireless communication device 204 (e.g., supported data rates, device type (or class), the service set identifier (SSID) of the network it wishes to be associated with, etc.). After receiving the association request, BS or AP 202 considers associating with wireless communication device 204, and (if accepted) reserves memory space and establishes an association ID for wireless communication device 204.

In accordance with an embodiment, wireless communication device 204 advertises two constellation thresholds for each bandwidth and number of spatial streams (e.g., antennas) combination supported by wireless communication device 204. Each of the two constellation thresholds define a constellation level (e.g., binary phase-shift keying (BPSK), quadrature phase-shift keying (QPSK), 16-quadrature amplitude modulation (QAM), 64-QAM, 256-QAM, or 1024-QAM) at which a maximum duration of packet extension (e.g., 0 μs, 8 μs, or 16 μs) required by wireless communication device 204 is supported. Each of the two constellation thresholds may be provided as a three-bit encoding provided in an HE Capability Field of an association request provided by wireless communication device 204. The first of the two constellation thresholds may be referred to as "threshold-16," and the second of the two constellation thresholds may be referred to as "threshold-8."

FIG. 8 shows a table illustrating an example three-bit encoding used for each of the two constellation thresholds in accordance with an embodiment. As shown in FIG. 8, BPSK corresponds to a three-bit encoding of '000,' QPSK corresponds to a three-bit encoding of '001,' 16-QAM corresponds to a three-bit encoding of '010,' 64-QAM corresponds to a three-bit encoding of '011,' 256-QAM corresponds to a three-bit encoding of '100,' and 1024-QAM corresponds to a three-bit encoding of '101.' If wireless communication device 204 only supports a 16 μs packet extension, the three-bit encoding of threshold-8 may be set to '111,' and the three-bit encoding of threshold-16 may be set to the constellation at which a maximum packet extension of 16 μs is required. If wireless communication device 204 only supports an 8 μs packet extension, the three-bit encoding of threshold-16 may be set to '111,' and the three-bit encoding of threshold-8 may be set to the constellation at which a maximum packet extension of 8 μs is required. If wireless communication device 204 does not support any type of packet extension, then both threshold-8 and threshold-16 may be set to '111'.

Processor 208 may compare the constellation to be used when transmitting, a packet to the three-bit encodings of threshold-16 and threshold-8 to infer the maximum packet extension duration supported by wireless communication device 204 and determine the duration of the packet extension to be added to the end of the packet. For example, processor 208 may compare the constellation to be used when transmitting a packet (i.e., the transmitting constellation) to the constellation represented by the three-bit encoding of threshold-16. If the transmitting constellation is greater than or equal to the constellation represented by the three-bit encoding of threshold-16, then processor 208 may determine that wireless communication device 204 supports a maximum packet extension of 16 μs. If the transmitting constellation is not greater than or equal to the constellation represented by the three-bit encoding of threshold-16, processor 208 may compare the transmitting constellation to the constellation represented by the three-bit encoding of threshold-8. If the transmitting constellation is greater than or equal to the constellation represented by the three-bit encoding of threshold-8, then processor 208 may determine that wireless communication device 204 supports a maximum packet extension of 8 μs. If the transmitting constellation is not greater than or equal to the constellation represented by the three-bit encoding of threshold-8, processor 208 may determine that no packet extension is required for the packet.

In accordance with an embodiment, if wireless communication device 204 supports a bandwidth of greater than and/or equal to 80 MHz, thresholds are not defined for RU sizes less than and/or equal to 242 tones (i.e., 20 MHz). In accordance with another embodiment, no thresholds are defined for a RU size less than 242 tones. For such low-power use cases, it would be advantageous to use a packet extension (i.e., it may be more advantageous to use a packet extension rather than running the PHY hardware clocks faster to meets SIFS).

Processor 208 may determine the duration of the packet extension to be added to the end of a packet based on the segment boundary parameter and the determined maximum packet extension duration. In accordance with an embodiment, if the determined maximum packet extension duration is 8 μs and the segment boundary parameter is either 1 or 2 (i.e., the encoded value is '01' or '10,' as shown in FIG. 5), then no packet extension is added. If the determined maximum packet extension duration is 8 μs and the segment boundary parameter is 3 (i.e., the encoded value is '11,' as shown in FIG. 5), then a packet extension of is 4 μs added to the end of the packet. If the determined maximum packet extension duration is 8 μs and the segment boundary parameter is 4 (i.e., the encoded value is '00,' as shown in FIG. 5), then a packet extension of is 8 μs added to the end of the packet.

For example, FIGS. 9A-9D show block diagrams illustrating the determined maximum packet extension for a given segment boundary parameter when the determined maximum packet extension duration for wireless communication device 204 is 8 μs. In particular, FIGS. 9A-9D show block diagrams of a portion of a PPDU packet 900 to be transmitted to a wireless communication device for which it is determined that a maximum packet extension duration of 8 μs is supported in accordance with one or more embodiments. In particular, PPDU packet 900 shown in each of FIGS. 9A-9D is a portion of a data payload field (e.g., data payload field 316, as shown in FIG. 3) for sake of brevity. As shown in each of FIGS. 9A-9D, PPDU packet 900 includes a first OFDM symbol 902, a second OFDM symbol 904, and a third OFDM packet 906. Third OFDM symbol 906 is the final symbol of the data payload field of PPDU packet 900 in each of FIGS. 9A-9D. As further shown in FIGS. 9A-9D, first OFDM symbol 902 and second OFDM symbol 904 fully comprise data payload, and third OFDM symbol 906 partially includes a combination of data payload and/or a first type of padding (e.g, MAC padding).

FIG. 9A shows an embodiment in which the combination of data payload and/or the first type of padding is included up to first segment boundary 912 (i.e., one symbol segment (first short symbol segment 920) includes the combination of data payload and/or the first type of padding), and a second type of padding (i.e., PHY padding 910) is included in the remaining symbol segments (i.e., second short symbol segment 922, third short symbol segment 924, and fourth short symbol segment 926). Thus, in accordance with such an embodiment, the segment boundary parameter is equal to '1' (i.e., encoded value '01', as shown in FIG. 5), and no packet extension is added to the end of third OFDM symbol 906 (i.e., the packet extension duration is 0 µs).

FIG. 9B shows an embodiment in which the combination of data payload and/or the first type of padding is included up to second segment boundary 914 (i.e., two short symbol segments (first short symbol segment 920 and second short symbol segment 922) includes the combination of data payload and/or the first type of padding), and the second type of padding (i.e., PHY padding 910) is included in the remaining symbol segments (i.e., third short symbol segment 924 and fourth short symbol segment 926). Thus, in accordance with such an embodiment, the segment boundary parameter is equal to '2' (i.e., encoded value '10', as shown in FIG. 5), and no packet extension is added to the end of third OFDM symbol 906 (i.e., the packet extension duration is 0 µs).

Figure 9C:
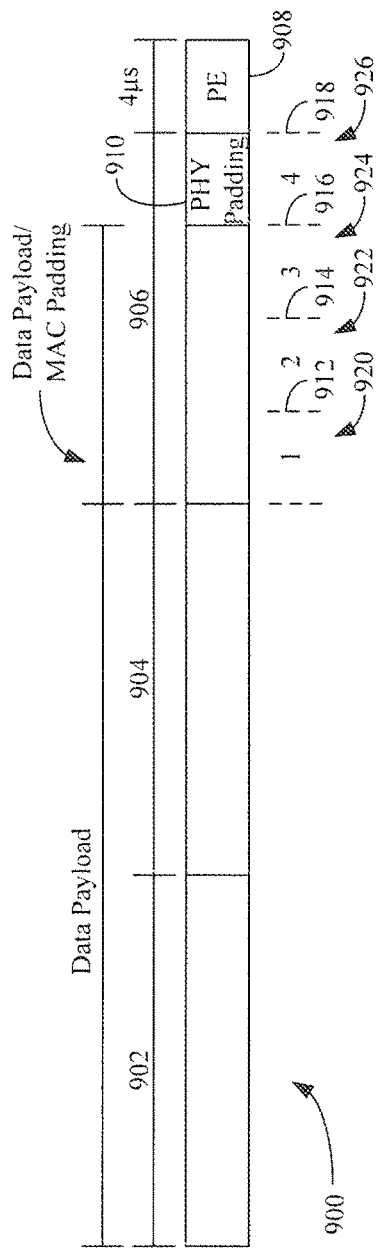

FIG. 9C shows an embodiment in which the combination of data payload and/or the first type of padding is included up to third segment boundary 916 (i.e., three short symbol segments (first short symbol segment 920, second short symbol segment 922, and third short symbol segment 924) includes the combination of data payload and/or the first type of padding), and the second type of padding (i.e., PHY padding 910) is included in the remaining symbol segment (i.e., fourth symbol segment 926). Thus, in accordance with such an embodiment, the segment boundary parameter is equal to '3' (i.e., encoded value '11', as shown in FIG. 5), and a packet extension of 4 µs is added to the end of third OFDM symbol 906.

Figure 9D:
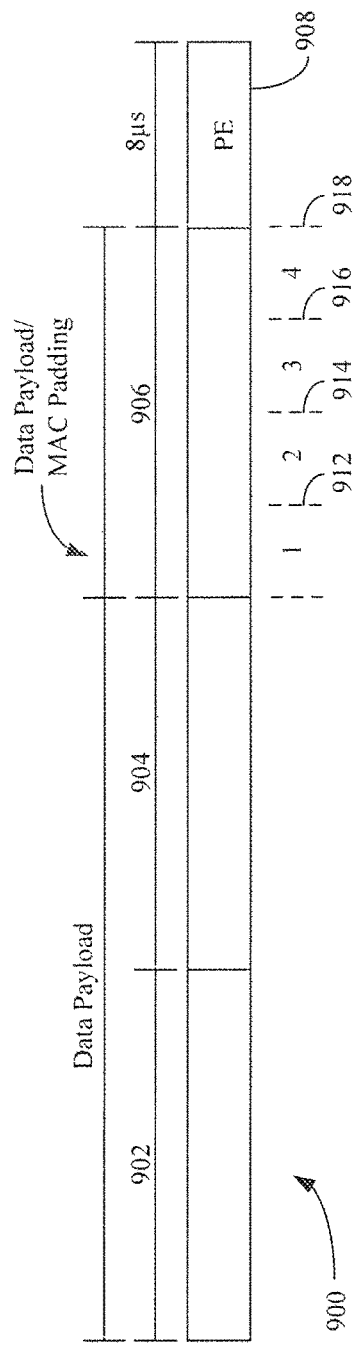

FIG. 9D shows an embodiment in which the combination of data payload and/or the first type of padding is included up to fourth segment boundary 918 (i.e., four short symbol segments (first short symbol segment 920, second short symbol segment 922, third short symbol segment 924, and fourth short symbol segment 926) includes the combination of data payload and/or the first type of padding), and therefore, no second type of padding is added to third OFDM symbol 906. Thus, in accordance with such an embodiment, the segment boundary parameter is equal to '4' (i.e., encoded value '00', as shown in FIG. 5), and a packet extension of 8 µs is added to the end of third OFDM symbol 906.

In accordance with an embodiment, if the determined, maximum packet extension duration is 16 µs and the segment boundary parameter is 1 (i.e., the encoded value is '01', as shown in FIG. 5), then a packet extension of 4 µs is added to the end of the packet. If the determined maximum packet extension duration is 16 µs and the segment boundary parameter is >2 (i.e., the encoded value is '10', as shown in FIG. 5), then a packet extension of 8 µs is added to the end of the packet. If the determined maximum packet extension duration is 16 µs and the segment boundary parameter is 3 (i.e., the encoded value is '11,' as shown in FIG. 3), then a packet extension of 12 µs is added to the end of the packet. If the determined maximum packet extension duration is 16 µs and the segment boundary parameter is 4 (i.e., the encoded value is '00,' as shown in FIG. 3), then a packet extension of 16 µs is added to the end of the packet.

Figure 10A:
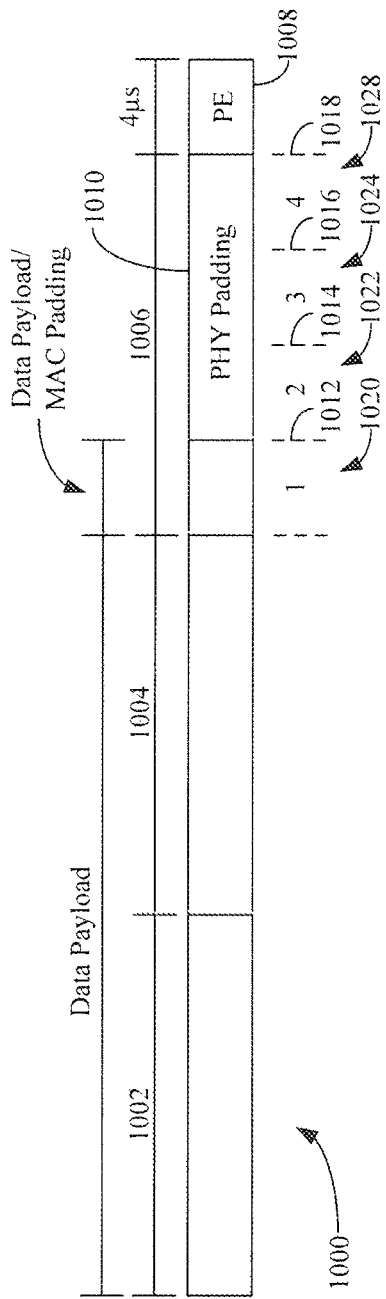
FIGS. 10A-10D show block diagrams of a portion of a PPDU packet to be transmitted to a wireless communication device for which it is determined that a maximum packet extension duration of 16 µs is supported in accordance with one or more embodiments.

For example, FIGS. 10A-10D show block diagrams illustrating the determined maximum packet extension for a given segment boundary parameter when the determined maximum packet extension duration for wireless communication device 204 is 14 µs. In particular, FIGS. 10A-101D show block diagrams of a portion of a PPDU packet 1000 to be transmitted to a wireless communication device for which it is determined that a maximum packet extension duration of 16 µs is supported in accordance with one or more embodiments. In particular, PPDU packet 1000 shown in each of FIGS. 10A-10D is a portion of a data payload field (e.g., data payload field 316, as shown in FIG. 3) for sake of brevity. As shown in each of FIGS. 10A-10D, PPDU packet 1000 includes a first OFDM symbol 1002, a second OFDM symbol 1004, and a third OFDM packet 1006. Third OFDM symbol 1006 is the final symbol of the data payload field of PPDU packet 1000 in each of FIGS. 10A-10D. As further shown in FIGS. 10A-10D, first OFDM symbol 1002 and second OFDM symbol 1004 fully comprise data payload, and third OFDM symbol 1006 partially includes a combination of data payload and/or a first type of padding (e.g., MAC padding).

FIG. 10A shows an embodiment in which the combination of data payload and/or the first type of padding is included up to first segment boundary 1012 (i.e., one short symbol segment (first short symbol segment 1020) includes the combination of data payload and/or the first type of padding), and a second type of padding (i.e., PHY padding 1010) is included in the remaining symbol segments (i.e., second short symbol segment 1022, third short symbol segment 1024, and fourth short symbol segment 1026). Thus, in accordance with such an embodiment, the segment boundary parameter is equal to '1' (i.e., encoded Value '01', as shown in FIG. 5), and a packet extension of 4 µs is added to the end of third OFDM symbol 1006.

Figure 10B:
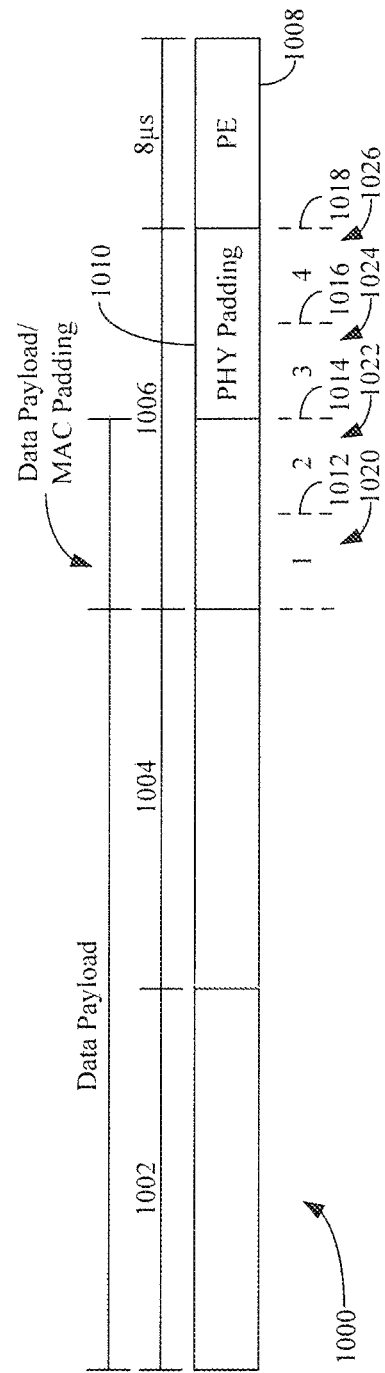

FIG. 10B shows an embodiment in which the combination of data payload and/or the first type of padding is included up to second segment boundary 1014 (i.e., two short symbol segments (first short symbol segment 1020 and second short symbol segment 1022) includes the combination of data payload and/or the first type of padding), and the second type of padding (i.e., PHY padding 1010) is included in the remaining symbol segments (i.e., third short symbol segment 1024 and fourth short symbol segment 1026). Thus, in accordance with such an embodiment, the segment boundary parameter is equal to '2' (i.e., encoded value '10', as shown in FIG. 5), and a packet extension of 12 µs is added to the end of third OFDM symbol 1006.

Figure 10C:
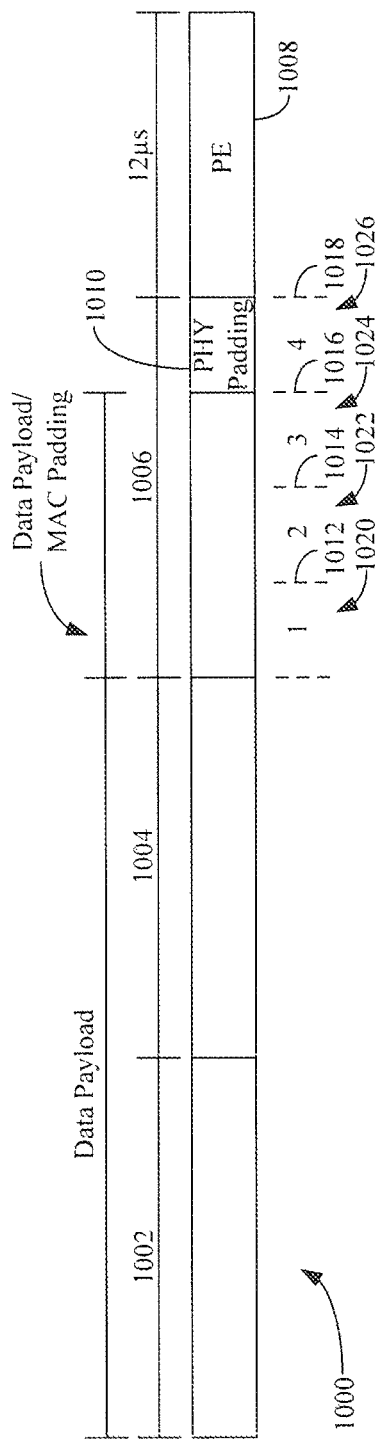

FIG. 10C shows an embodiment in which the combination of data payload and/or the first type of padding is included up to third segment boundary 1016 (i.e., three short symbol segments (first short symbol segment 1020, second short symbol segment 1022, and third short symbol segment 1024) includes the combination of data payload and/or the first type of padding), and the second type of padding (i.e., PHY padding 1010) is included in the remaining symbol segment (i.e., fourth short symbol segment 1026). Thus, in accordance with such an embodiment, the segment boundary parameter is equal to '3' (i.e., encoded value '11', as shown in FIG. 5), and a packet extension of 12 µs is added to the end of third OFDM symbol 906.

Figure 10D:
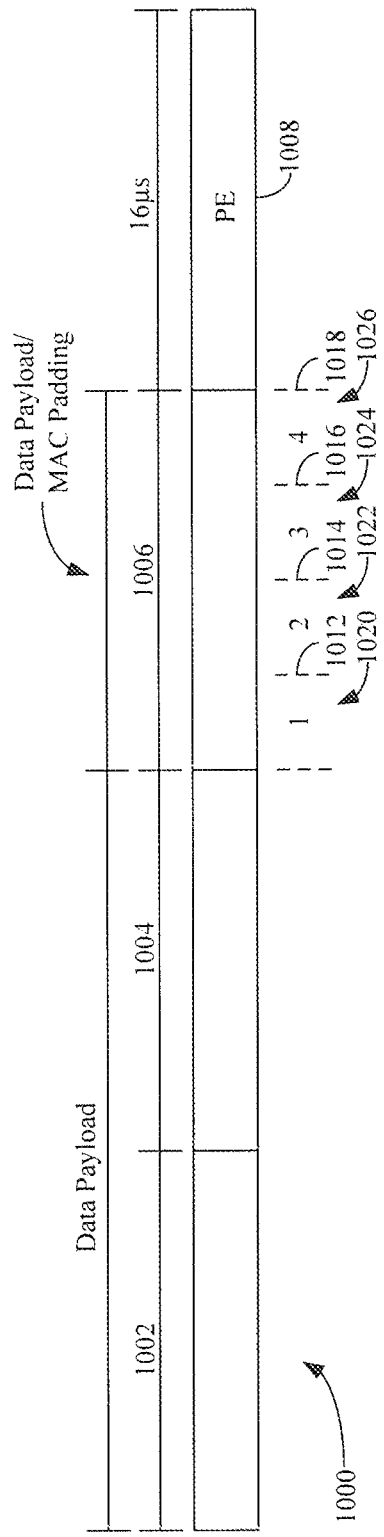

FIG. 10D shows an embodiment in which the combination of data payload and/or the first type of padding is included up to fourth segment boundary 1018 (i.e., four short symbol segments (first short symbol segment 1020, second short symbol segment 1022, third short symbol segment 1024, and fourth short symbol segment 1026) includes the combination of data payload and/or the first type of padding), and therefore, no second type of padding is added to third OFDM symbol 1006. Thus, in accordance with such an embodiment, the segment boundary parameter is equal to '4' (i.e., encoded value '00', as shown in FIG. 5), and a packet extension of 16 µs is added to the end of third OFDM symbol 906.

In accordance with an embodiment, to ensure that legacy devices respect the total frame duration (and therefore do not interfere with another device's transmission), the LENGTH field of the L-SIG field (e.g., L-SIG 306, as shown in FIG. 3) includes the duration combination from any packet extension used when transmitting a packet. In accordance with such an embodiment, the LENGTH field is determined in accordance with Equation 2, which is shown below:

$$\text{LENGTH} = \left(\frac{TXTIME - 20}{4\mu s}\right) \times 3 - 3 \qquad \text{Equation 2}$$

where TXTIME is equal to the time it takes to transmit the packet (e.g., the time it takes to transmit the legacy preamble (e.g., legacy preamble 320, as shown in FIG. 3), the HE preamble (e.g., HE preamble 322, as shown in FIG. 3) and the data payload) plus the duration of the packet extension.

In accordance with one or more embodiments, the packet extension added to the end of a frame has the same average power as the data payload. This may achieved by repeating a certain portion of the data payload included in the final OFDM symbol to realize the necessary packet extension duration. In an embodiment in which a 0.8 µs guard interval and a 16 µs packet extension is used, the portion may be repeated 1.2 times.

In accordance with an embodiment in which STBC is used, wireless communication device 204 may signal to AP or BS 202 the packet extension supported by wireless communication device 204 during the association phase. For example, wireless communication device 204 may provide an association request that includes a capability field that specifies the packet extension duration supported when using STBC. By doing so, BS or AP 202 need not infer the maximum packet extension supported by wireless communication device 204 when using STBC.

In accordance with an embodiment, wireless communication, device 204, when receiving a packet, may infer the data payload length from the number of received symbols, the segment boundary parameter and/or the LDPC parameter (in embodiments in which LDPC is used). Wireless communication device 204 may further infer the duration of the packet extension based on the segment boundary parameter.

The encoding scheme that may be used for a single user transmission scheme is described as follows. The number of payload symbols ($N_{SYM\_init}$) may be determined in accordance with Equation 3, which is shown below:

$$N_{SYM\_init} = \qquad \text{(Equation 3)}$$

$$\begin{cases} m_{STBC} \left\lceil \dfrac{8 \cdot \text{APEP\_LENGTH} + N_{service} + N_{tail} \cdot N_{ES}}{m_{STBC} \cdot N_{DBPS}} \right\rceil & \text{if } BCC \\ m_{STBC} \left\lceil \dfrac{8 \cdot \text{APEP\_LENGTH} + N_{service}}{m_{STBC} \cdot N_{DBPS}} \right\rceil & \text{if } LDPC \end{cases}$$

where $m_{STBC}$ indicates a coding scheme used for transmission (e.g., the value of 2 may correspond to the STBC mode, and the value of 1 may correspond to another mode), APEP_LENGTH is a configuration transmit vector length value, $N_{ES}$, $N_{tail}$ and $N_{service}$ are the number of binary convolution coding (BCC) encoders (e.g., implemented by processor 208, as shown by FIG. 2) used to encode a packet, the number of tail bits included in the packet, and the number of service bits included in the packet, respectively, and $N_{DBPS}$ is the number of data bits per OFDM symbol.

Next, the number of excess bits included in the final OFDM symbol are calculated. The number of excess bits may be calculated in accordance with Equation 4, which is shown below:

$$N_{excess} = \begin{cases} \text{mod}(8 \cdot \text{APEP\_LENGTH} + N_{service} + \\ \quad N_{tail} \cdot N_{ES}, m_{STBC} \cdot N_{DBPS}) & \text{if } BCC \\ \text{mod}(8 \cdot \text{APEP\_LENGTH} + N_{service}, \\ \quad m_{STBC} \cdot N_{DBPS}) & \text{if } LDPC \end{cases} \qquad \text{(Equation 4)}$$

Next, the number of coded bits per short symbol ($N_{CBPS\_Short}$) and the number of uncoiled bits per short symbol ($N_{DBPS\_Short}$) and may be determined in accordance with Equations 5 and 6, which are shown below:

$$N_{CBPS\_short} = N_{SD\_short} \cdot N_{SS} \cdot N_{BPSCS} \qquad \text{(Equation 5)}$$

$$N_{DBPS}\_\text{short} = N_{CBPS\_short} \cdot R \qquad \text{(Equation 6)}$$

where $N_{SD}$ corresponds to the number of tones, $N_{SD\_short}$ corresponds to the number of tones per short symbol, and R is the coding rate. $N_{SD\_short}$ may be defined based on the number tones $N_{SD}$ in accordance with the table 600 shown in FIG. 6.

Thereafter, an initial excess factor $a_{init}$ is determined. $a_{init}$ may be determined in accordance with Equation 7, which is shown below:

$$a_{init} = \begin{cases} 4 & \text{if } N_{EXCESS} = 0 \\ \left\lceil \dfrac{N_{EXCESS}}{m_{STBC} \cdot N_{DBPS,SHORT}} \right\rceil & \text{otherwise} \end{cases} \qquad \text{(Equation 7)}$$

Next, the payload length used for encoding the number of payload bits ($N_{pld}$) may be determined in accordance with Equation 8, which is shown below:

$$N_{pld} = N_{SYM\_init} \cdot N_{DBPS} \text{ if } a_{init} = 4$$

else $$N_{pld} = (N_{SYM\_init} - m_{STBC}) \cdot N_{DBPS} m_{STBC} \cdot a_{init} \cdot N_{DBPS\_Short} \qquad \text{(Equation 8)}$$

Next, the number of available bits ($N_{avbits}$) post-encoding is determined. $N_{avbits}$ may be determined in accordance with Equation 9, which is shown below:

$$N_{avbits} = N_{SYM\_init} \cdot N_{CBPS} \text{ if } a=4$$

else $$N_{avbits} = (N_{SYM\_init} - m_{STBC}) \cdot N_{CBPS} + a \cdot m_{STBC} \cdot N_{CBPS\_Short}$$ (Equation 9)

where a is the determined segment boundary parameter.

Figure 11:
FIG. 11 shows a table for determining a number of codewords and a codeword length for a packet in accordance with an embodiment.

In accordance with an embodiment in which LDDC is used, the number of codewords and codeword length are determined may be determined in accordance with table 1100 shown in FIG. 11.

Next, the number of shortening (zero) bits ($N_{shrt}$) to be padded to the data bits before encoding (and that are discarded after encoding) is determined. $N_{shrt}$ may be determined in accordance with Equation 10. Equation 10 is shown below:

$$N_{shrt} = \max(0, (N_{CW} \times L_{LDPC} \times R) - N_{pld})$$ (Equation 10)

where $L_{LDPC}$ corresponds to the codeword length.

The shortening bits are evenly distributed over all codewords with the first rem(Nshrt, $N_{CW}$) (i.e., the resulting remainder when $N_{shrt}$ is divided by $N_{CW}$) codewords being shortened 1 bit more than the remaining codewords.

Then, the number of punctured parity bits ($N_{punc}$) to be removed after encoding is determined. $N_{punc}$ may be determined in accordance with Equation 11, which is shown below:

$$N_{punc} = \max(0, (N_{CW} \times L_{LDPC}) - N_{avbits} - N_{pld})$$ (Equation 11)

An additional short symbol segment of parity bits is to be transmitted if Equation 12 (shown below, and also referred to as the "LDPC extra symbol rule") is satisfied:

$$\left( (N_{punc} > 0.1 \times N_{CW} \times L_{LDPC} \times (1-R)) \text{ AND} \right.$$
$$\left. \left( N_{shrt} < 1.2 \times N_{punc} \times \frac{R}{1-R} \right) \right) \text{ OR,}$$
$$(N_{punc} > 0.3 \times N_{CW} \times L_{LDPC} \times (1-R))$$
(Equation 12)

If an additional short symbol of parity bits is being sent, then the LDDC "extra symbol" bit field is set in the HE-SIG-A field, and $N_{avbits}$ is updated in accordance with Equation 13, which is shown below:

$$N_{avbits} = N_{avbits} + m_{STBC} \cdot (N_{CBPS} - 3 \cdot N_{CBPS\_Short}) \text{ if } a_{init} = 3$$

else $$N_{avbits} = N_{avbits} + m_{STBC} \cdot N_{CBPS\_Short}$$ (Equation 13)

Figure 12:
FIG. 12 shows a table for determining a number of symbols in a packet in accordance with an embodiment.

The number of symbols and segments are also updated. The number of symbols and segments may be updated in accordance with table 1200 shown in FIG. 12. $N_{punc}$ is then recalculated in accordance with Equation 14, which is shown below:

$$N_{punc} = \max(0, (N_{CW} \times L_{LDPC}) - N_{avbits} - N_{pld})$$ (Equation 14)

If no additional symbol, segment is sent, then the initial number of symbols $N_{SYM\_init}$ and initial excess factor $a_{init}$ are used, as shown below in Equations 15 and 16:

$$N_{SYM} = N_{SYM\_init}$$ (Equation 15)

$$a = a_{init}$$ (Equation 16)

The punctured bits are evenly distributed over all codewords with the first rem($N_{punc}$, $N_{CW}$) (i.e., the remainder when $N_{punc}$ is divided by $N_{CW}$) codewords being punctured 1 bit more than the remaining codewords.

For LDPC, the number of coded bits to be repeated after encoding are determined in accordance with Equation 17, which is shown below:

$$N_{rep} = \max(0, N_{avbits} - (N_{CW} \times L_{LDPC} \times (1-R)) - N_{pld})$$ (Equation 17)

The repeated bits are evenly distributed over all codewords with the first rem($N_{rep}$, $N_{CW}$) (i.e., the remainder when $N_{rep}$ is divided by $N_{CW}$) codewords being repeated 1 bit more than the remaining codewords.

Next, the number of pre-FEC padding bits $N_{PAD1}$ and post-FEC padding bits $N_{PAD2}$ may be determined in accordance with Equations 18 and 19, respectively, when using a BCC error correction scheme or Equations 20 and 21, respectively, when using an LDPC error correction scheme. Equations 16-19 are shown below:

$$N_{PAD1} = N_{pld} - 8 \cdot \text{APEP\_LENGTH} - N_{service} - N_{ES} \cdot N_{tail}$$ (Equation 18)

$$N_{PAD2} = N_{SYM} \times N_{CBPS} = N_{avbits}$$ (Equation 19)

$$N_{PAD1} = N_{pld} - 8 \cdot \text{APEP\_LENGTH} - N_{service}$$ (Equation 20)

$$N_{PAD2} = N_{SYM} \times N_{CBPS} - N_{avbits}$$ (Equation 21)

Finally, the required packet extension is determined. In particular, the required maximum packet extension duration to use is determined based on the constellation thresholds provided for each bandwidth and number of spatial streams (e.g., antennas) combination supported by wireless communication device 204, as described above.

Figure 13:
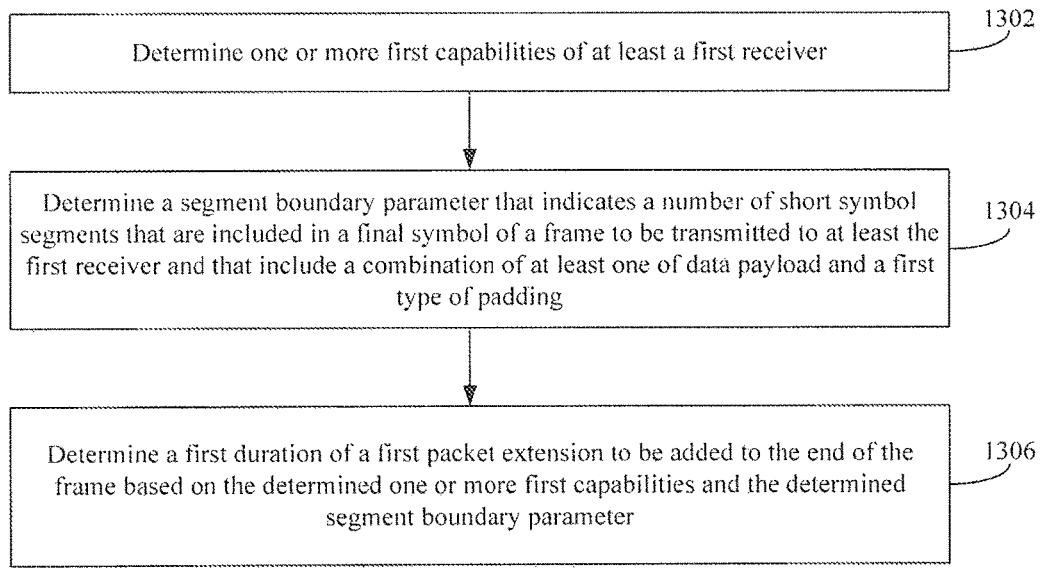
FIG. 13 shows a flowchart of a method performed by a transmitter for determining a packet extension duration in accordance with an embodiment
Figure 14:
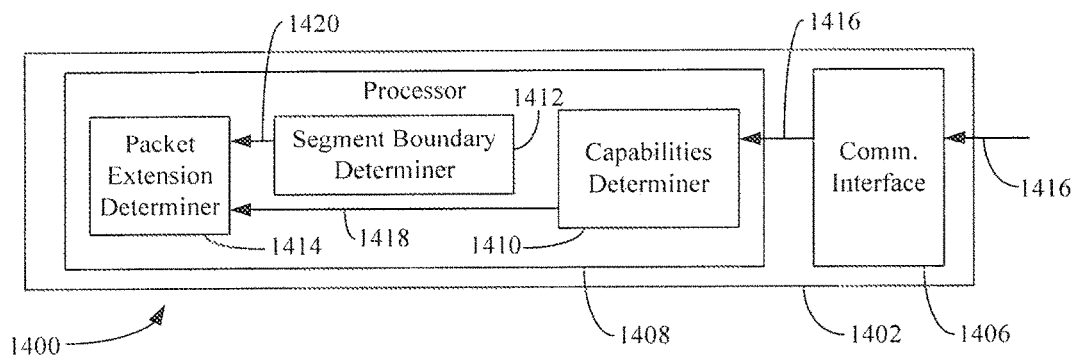
FIG. 14 shows a block diagram of a transmitter in accordance with an embodiment.

Accordingly, in embodiments, a transmitting device may be configured to provide a packet extension for a packet in many ways. For instance, FIG. 13 shows a flowchart 1300 of a method performed by a transmitter (e.g., a device transmitting a DL packet) for determining a packet extension duration in accordance with an embodiment. The method of flowchart 1300 may be implemented by a transmitter 1402 shown in FIG. 14. FIG. 14 depicts a block diagram 1400 of transmitter 1402 in accordance with an embodiment. Transmitter 1402 is an example of BS or AP 202, as described above in reference to FIG. 2. As shown in FIG. 14, transmitter 1402 includes a communication interface 1406 and a processor 1408. Communication interface 1406 is an example of communication interface 206, and processor 1408 is an example of processor 208, as described above in reference to FIG. 2. Processor 1408 includes a capabilities determiner 1410, a segment boundary determiner 1412, and a packet extension determiner 1414. Other structural and operational embodiments will be apparent to persons skilled in the relevant art(s) based on the following discussion regarding flowchart 1300 and transmitter 1402.

Flowchart 1300 begins with step 1302. At step 1302, one or more first capabilities of at least a first receiver (e.g., a device receiving, a DL packet) are determined. For example, with reference to FIG. 14, capabilities determiner 1406 may determine one or more first capabilities of at least the first receiver (e.g., wireless communication device 204, as shown in FIG. 2). In accordance with an embodiment, the one or more first capabilities are determined by receiving one or more parameters indicating the one or more first capabilities from at least the first receiver during an association process between the transmitter and at least the first receiver. For example, with reference to FIG. 14, communications interface 1406, during an association process between transmitter 1402 and at least the first receiver, may receive an association request 1416 including one or more parameters that indicate the one or more capabilities. Association request 1416 may be provided to capabilities determiner 1410. Capabilities determiner 1410 may be configured to determine the one or more parameters included in association request 1416 and determine one or more capabilities 1418 of at least the first receiver from the parameter(s).

In accordance with an embodiment, the one or more parameters are one or more constellation thresholds that each define a constellation level at which a maximum duration of packet extension supported by at least the first receiver is changed. For example, at least the first receiver may advertise two constellation thresholds for each bandwidth and number of spatial streams combination supported by at least the first receiver. The constellation thresholds (e.g., one or more capabilities 1418) are provided to packet extension determiner 1418.

At step 1304, a segment boundary parameter that indicates a number of short symbol segments that are included in a final symbol of a frame to be transmitted to at least the first receiver and that include a combination of at least one of a data payload and a first type of padding is determined. For example, with reference to FIG. 14, segment boundary determiner 1412 may determine a segment boundary parameter 1420 and provide segment boundary parameter 1420 to packet extension determiner 1414.

In accordance with one or more embodiments, one or more short symbol segments included in the final symbol that do not include the combination of at least one of the data payload and the first type of padding are padded with a second type of padding.

In accordance with one or more embodiments, the first type of padding is MAC padding (e.g., pre-FEC padding).

In accordance with one or more embodiments, the second type of padding is MAC padding (e.g., post-FEC padding).

In accordance with one or more embodiments, the determined segment boundary parameter is provided in a header of the frame. For example, the determined segment boundary parameter may be provided as a two-bit encoded value in the HE-SIG-A field (e.g., HE-SIG-A field 310, as shown in FIG. 3).

At step 1306, a first duration of a first packet extension to be added to the end of the frame based on the determined one or more first capabilities and the determined segment boundary parameter is determined. For example, with reference to FIG. 14, packet extension determiner 1414 may determine a first duration of a first packet extension to be added to the end of the frame based one or more capabilities 1418 and determined segment boundary parameter 1420. For instance, in accordance with an embodiment, if the determined maximum packet extension duration is 8 μs and the segment boundary parameter is either 1 or 2 (i.e., the encoded value is '01' or '10,' as shown in FIG. 5), then no packet extension is added. If the determined maximum packet extension duration is 8 μs and the segment boundary parameter is 3 (i.e., the encoded value is '11,' as shown in FIG. 5), then a packet extension of 4 μs is added to the end of the packet. If the determined maximum packet extension duration is 8 μs and the segment boundary parameter is 4 (i.e., the encoded value is '00,' as shown in FIG. 5), then a packet extension of 8 μs is added to the end of the packet. In accordance with an embodiment, if the determined maximum packet extension duration is 16 μs and the segment boundary parameter is 1 (i.e., the encoded value is '01', as shown in FIG. 5), then a packet extension of 4 μs is added to the end of the packet. If the determined maximum packet extension duration is 16 μs and the segment boundary parameter is 2 (i.e., the encoded value is '10,' as shown in FIG. 5), then a packet extension of 8 μs is added to the end of the packet. If the determined maximum packet extension duration is 16 μs and the segment boundary parameter is 3 (i.e., the encoded value is '11,' as shown in FIG. 5), then a packet extension of 12 μs is added to the end of the packet. If the determined maximum packet extension duration is 16 μs and the segment boundary parameter is 4 (i.e., the encoded value is '00,' as shown in FIG. 5), then a packet extension of 16 μs is added to the end of the packet.

In accordance with one or more embodiments, a value of a legacy length field to be provided in a header of the frame based at least on the first duration of the first packet extension is determined. For example, the determined value may be provided in the LENGTH field of the L-SIG field (e.g. L-SIG 306, as shown in FIG. 3).

In some example embodiments, one or more of steps 1302, 1304, and/or 1306 of flowchart 1300 may not be performed. Moreover, operations in addition to or in lieu of steps 1302, 1304, and/or 1306 may be performed. Further, in some example embodiments, one or more of steps 1302, 1304, and/or 1306 may be performed out of order, in an alternate sequence, or partially (or completely) concurrently with each other or with other operations.

B. Multi-User (MU) Transmission Schemes

In accordance with an embodiment, a BP or AP may provide a packet to a plurality of wireless communication devices. The single-user (SU) padding and packet extension scheme described above in Subsection A may be generalized for DL MU transmission schemes. For example, multiple wireless communication devices may be grouped together to find a common frame length and symbol segment padding. The longest packet extension from among all wireless communication devices may be determined and applied to the frame. In accordance with such an embodiment, a common segment boundary parameter is provided to all receiving devices that are to receive a packet. In accordance with an embodiment in which LDPC is used, a common LDPC flag for the extra LDPC symbol is also provided to all wireless communication devices.

Figure 15:
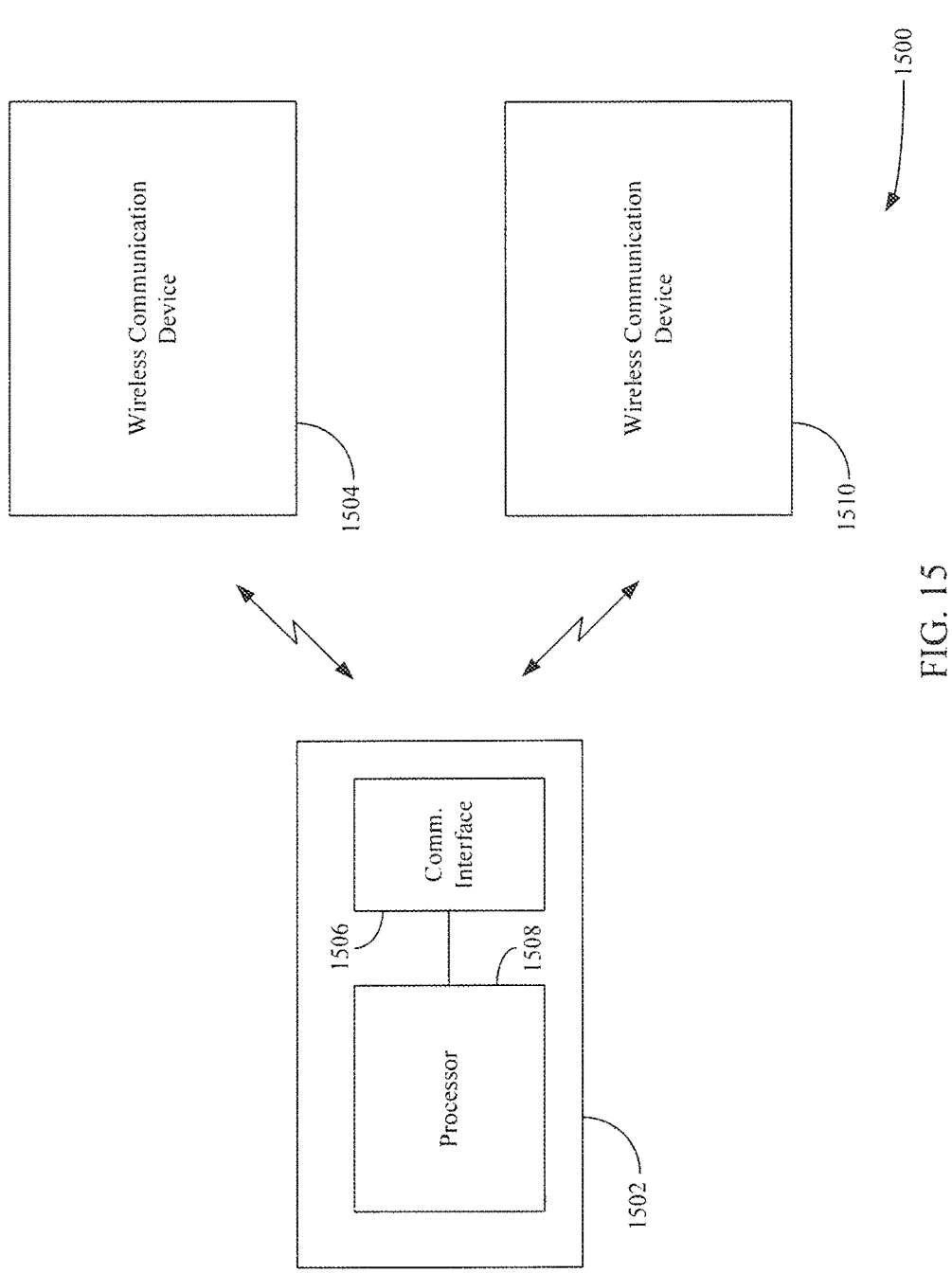
FIG. 15 is a block diagram of a system for providing a packet extension for a packet to be transmitted to a plurality of wireless communication devices in accordance with an embodiment.

FIG. 15 is a block diagram of a system 1500 for providing a packet extension for a packet to be transmitted to a plurality of wireless communication devices 1504 and 1510 in accordance with an embodiment. As shown in FIG. 15, system 1500 includes a BS or AP 1502, wireless communication device 1504, and wireless communication device 1510. BS or AP 1502 is an example of BS or AP 202, and wireless communication devices 1504 and 1510 are examples of wireless communication device 204, as described above in reference to FIG. 2.

BS or AP 1502 may include a communication interface 1506 and a processor 1508. Communication interface 1506 may be configured to transmit and/or and receive one or more packets to and/or from any of wireless communication devices 1504 and 1510. Processor 1508 may be configured to perform various operations including generating, formatting and/or encoding packet(s) for transmission by communication interface 1506 and/or decoding packet(s) received from any of wireless communication devices 1504 and 1510 via communication interface 1506. When transmitting packets in accordance with the IEEE 802.11ax protocol, processor 1508 may be further configured to add one or more types of padding to the data payload included in the packet(s) and/or a packet extension to the packet(s). Communication interface 1506 may comprise antenna(s).

To determine the duration of a packet extension to be added at the end of a packet, processor 1508 may determine the segment boundary parameter associated with the packet (as described above in Subsection A) and one or more capabilities (e.g., constellation thresholds) of each of wireless communication devices 1504 and 1510 (as also described above in Subsection A). Processor 1508 may determine a respective packet extension duration for the packet for each of wireless communication device 1504 and 1510 and compare each of the determined packet extension durations to determine which packet extension duration is the longest. Processor 1508 may add the packet extension having the longest duration to the packet, provide the determined segment boundary parameter in the header of the packet (e.g., in HE-SIG-A field 310, as shown in FIG. 3), and transmit the packet to each of wireless communication device 1504 and 1510.

The encoding scheme that may be used for a downlink multi-user transmission scheme is described as follows. The number of payload symbols for each wireless communication device ("user") u ($N_{SYM\ init,u}$) may be determined in accordance with Equation 22, which is shown below:

$$N_{SYM\ init,u} = \begin{cases} \left\lceil \dfrac{8 \cdot APEP\_LENGTHu + N_{service} + N_{tail} \cdot N_{ES,u}}{N_{DBPS,u}} \right\rceil & \text{when user } u \text{ user BCC} \\ \left\lceil \dfrac{8 \cdot APEP\_LENGTHu + N_{service}}{N_{DBPS,u}} \right\rceil & \text{when user } u \text{ uses LDPC} \end{cases}$$ (Equation 3)

where the number of excess bits per user ($N_{excess,u}$) and the initial excess factor per user ($a_{init,u}$) may be determined in accordance with the Equations provided for the single user encoding scheme described above in Subsection A, where $N_{DBPS}$, $N_{CBPS}$, $N_{DBPS\_DBPS\_Short}$, and $N_{CBPS\_Short}$ are replaced with the per user values.

Next, the largest number of initial symbols across all users ($N_{SYM\ max\ init}$) is determined. $N_{SYM\ max\ init}$ may be determined in accordance with Equation 23, which is shown below:

$$N_{SYM\ max\ init} = \max \{N_{SYM\ init,u}\}_{u=0}^{N_{user}-1}$$ (Equation 23)

If two or more users correspond to $N_{SYM\ max\ init}$, then $a_{max\ init}$ is set equal to the largest initial excess factor across those users. Otherwise, $a_{max\ init}$ is set equal to $a_{init,u}$ of the user corresponding to $N_{SYM\ max\ init}$.

Next, for each user u that uses LDPC encoding, new values are computed for $N_{SYM,u}$ and $a_u$ in accordance to the Equations provided for the single user encoding scheme described above in Subsection A, where $N_{NBPS}$, $N_{CBPS}$, $N_{DBPS\_Short}$, and $N_{CBPS\_Short}$ are replaced with the per user values, and (8·APEP_LENGTHu+$N_{service}$) in Equation 22 is replaced with $N_{pld,u}$ in accordance with table 1600 shown in FIG. 16.

Then, the final number of symbols across the users is determined in accordance with Equation 24, which is shown below:

$$N_{SYM} = \max \{N_{SYM,u}\}_{u=0}^{N_{user}-1}$$ (Equation 24)

If two or more users correspond to $N_{SYM}$, then a is set equal to the largest value across those users. Otherwise, a is set equal to $a_u$, of the user corresponding to $N_{SYM}$. If $N_{SYM}$ is greater than $N_{SYM\ max\ init}$ or a is not equal to $a_{max\ init}$, then the LDPC "extra symbol" bit field is set in the HE-SIG-A field (MU LDPC extra symbol condition).

Each user a that uses LDPC encoding may be encoded in accordance with the Equations provided for the single user encoding scheme described above in Subsection A, where $N_{DBPS}$, $N_{CBPS}$, $N_{DBPS\_Short}$, and $N_{CBPS\_Short}$ are replaced with the per user values, and (8·APEP_LENGTHu+$N_{service}$) in Equation 22 is replaced with $N_{pld,u}$ in accordance with table 1600 shown in FIG. 16. If the MU LDPC extra symbol condition is true, then each LDPC user a requires an extra short symbol of parity bits (as described above). Thereafter, all LPC users will have a data duration defined by {$N_{SYM}$, a}.

Each user a that uses BCC encoding may be encoded in accordance with the Equations provided for the single user encoding scheme described above, where $N_{DBPS}$, $N_{CBPS}$, $N_{DBPS\_Short}$, and $N_{CBPS\_short}$ are replaced with the per user values, and (8·APEP_LENGTHu+$N_{service}$) in Equation 22 is replaced with $N_{pld,u}$ in accordance with table 1700 shown in FIG. 17. Thereafter, all BCC users will have a data duration defined by {$N_{SYM}$, a}.

Finally, the required packet extension is determined. For each user, the required maximum packet extension (i.e., 0 μs, 8 μs, or 16 μs) is determined based on the user's device capability (e.g., constellation thresholds). From the selected set, the specific signal extension $T_{SE,u}$ to apply to the frame is determined for each user based on the determined segment boundary parameter a. The MU signal extension $T_{SE}$ to be applied by all users may be determined in accordance with Equation 25, which is shown below:

$$T_{SE} = \max \{T_{SE,u}\}_{u=0}^{N_{user}-1}$$ (Equation 25)

Figure 18:
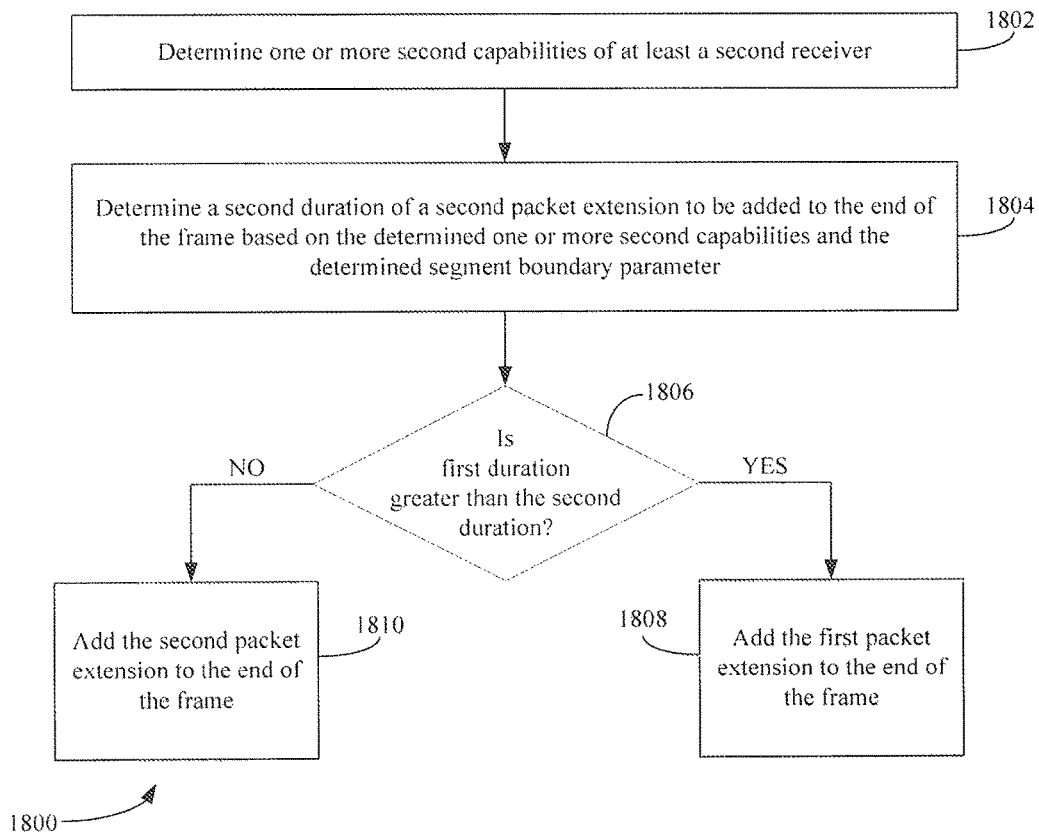
FIG. 18 shows a flowchart of a method performed by a transmitter for determining a packet extension duration in accordance with another embodiment.
Figure 19:
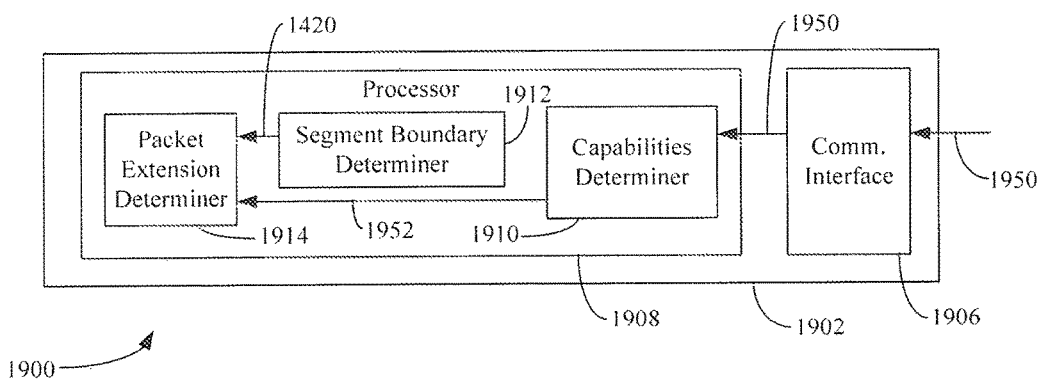
FIG. 19 shows a block diagram of a transmitter in accordance with another embodiment.

Accordingly, in embodiments, a transmitter may be configured to provide a packet extension for a packet transmitted to a plurality of receivers in many ways. For instance. FIG. 18 shows a flowchart 1800 of a method performed by a transmitter for determining a packet extension duration in accordance with an embodiment. The method of flowchart 1800 may be implemented by a transmitter 1902 shown in FIG. 19. FIG. 19 depicts a block diagram 1900 of transmitter 1902 in accordance with an embodiment. Transmitter 1902 is an example of transmitter 1402, as described above in reference to FIG. 14. As shown in FIG. 19, transmitter 1902 includes a communication interface 1906 and a processor 1908. Communication interface 1906 is an example of communication interface 1406 and processor 1908 is an example of processor 1408, as described above in reference to FIG. 14. Processor 1908 includes a capabilities determiner 1910, a segment boundary determiner 1912, and a packet extension determiner 1914. Other structural and operational embodiments will be apparent to persons skilled in the relevant art(s) based on the following discussion regarding flowchart 1800 and transmitter 1902.

The steps of FIG. 18 are premised on the assumption that transmitter 1902 has already determined one or more capabilities of a first receiver (e.g., as described above with reference to step 1302) and has determined the duration of the packet extension with respect to the first receiver (e.g., as described above with reference to step 1304).

Flowchart 1800 begins with step 1802. At step 1802, one or more second capabilities of at least a second receiver is determined. For example, with reference to FIG. 19, capabilities determiner 1910 may determine one or more second capabilities of at least the second receiver (e.g., wireless communication device 1510, as shown in FIG. 15). In accordance with an embodiment, the one or more second capabilities are determined by receiving, one or more parameters indicating the one or more second capabilities from at least the second receiving device during an association process between the transmitter and at least the second receiver. For example, with reference to FIG. 19, communications interface 1906, during an association process between transmitter 1902 and the at least second receiver, may receive an association request 1950 including one or more parameters that indicate the one or more second capabilities. Association request 1950 may be provided to capabilities determiner 1910. Capabilities determiner 1910 may be configured to determine the one or more parameters included in association request 1950 and determine one or more capabilities 1952 of at least second the second receiver from the parameter(s).

At step 1806, a second duration of a second packet extension to be added to the end of the frame based on the determined one or more second capabilities and the determined segment boundary parameter is determined (e.g., segment boundary parameter 1420 determined in step 1304, as described above with reference to FIG. 13). For instance, with reference to FIG. 19, packet extension determiner 1914 may determine a second duration of a second packet extension to be added to the end of the frame is based on one or more second capabilities 1952 and determined segment boundary parameter 1420 (as described above in Subsection A). For instance, in accordance with an embodiment, if the determined maximum packet extension duration is 8 μs and the segment boundary parameter is either 1 or 2 (i.e., the encoded value is '01' or '10,' as shown in FIG. 5), then no packet extension is added. If the determined maximum packet extension duration is 8 μs and the segment boundary parameter is 3 (i.e., the encoded value is '11,' as shown in FIG. 5), then a packet extension of 4 μs is added to the end of the packet. If the determined maximum packet extension duration is 8 μs and the segment boundary parameter is 4 (i.e., the encoded value is '00,' as shown in FIG. 5), then a packet extension of 8 μs is added to the end of the packet. In accordance with an embodiment, if the determined maximum packet extension duration is 16 μs and the segment boundary parameter is 1 (i.e., the encoded value is '01', as shown in FIG. 5), then a packet extension of 4 μs is added to the end of the packet. If the determined maximum packet extension duration is 16 μs and the segment boundary parameter is 2 (i.e., the encoded value is '10', as shown in FIG. 5), then a packet extension of 8 μs is added to the end of the packet. If the determined maximum packet extension duration is 16 μs and the segment boundary parameter is 3 (i.e., the encoded value is '11,' as shown in FIG. 5), then a packet extension of 12 μs is added to the end of the packet. If the determined maximum packet extension duration is 16 μs and the segment boundary parameter is 4 (i.e., the encoded value is '00,' as shown in FIG. 5), then a packet extension of 16 μs is added to the end of the packet.

At step 1806, a determination is made as to whether the first duration is greater than the second duration. For example, with reference to FIG. 19, packet extension determiner 1914 may determine whether the first duration is greater than the second duration. If a determination is made that the first duration is greater than the second duration, flow continues to step 1808. Otherwise, flow continues to step 1810.

At step 1808, in response to a determination that the first duration is greater than the second duration, the first packet extension is added to the end of the frame. For example, with reference to FIG. 19 packet extension determiner 1914 adds the first packet extension to the end of the frame.

At step 1810, in response to a determination that the first duration is less than the second duration, the second packet extension is added to the end of the frame. For example, with reference to FIG. 19, packet extension determiner 1914 adds the second packet extension to the end of the frame.

In accordance with one or more embodiments, after the determined packet extension is added to the frame, the frame is transmitted to both at least the first receiver and the second receiver.

In some example embodiments, one or more of steps 1802, 1804, 1806, 1808, and/or 1810 of flowchart 1800 may not be performed. Moreover, operations in addition to or in lieu of steps 1802, 1804, 1806, 1808, and/or 1810 may be performed. Further, in some example embodiments, one or more of steps 1802, 1804, 1806, 1808, and/or 1810 may be performed out of order, in an alternate sequence, or partially (or completely) concurrently with each other or with other operations.

C. Uplink (UL) Transmission Embodiments

A BS or AP may send a trigger frame to one or more wireless communication devices that causes the wireless communication device(s) to transmit a trigger-based frame (e.g., a PPDU) to the BS or AP The trigger frame may include various information that the wireless communication device(s) use to format the trigger-based frame. In accordance with an embodiment, such information includes, but is not limited to, a packet extension duration required by the BS or AP, the number of symbols that the trigger-based frame is to include, the short symbol padding to use, an LDPC extra symbol, a per-wireless communication device bandwidth used to transmit the trigger-based frame, a per-wireless communication device number of spatial streams used to transmit the trigger-based PPDU, and/or a per-wireless communication device modulation coding scheme used to transmit the trigger-based frame. It is noted that are no per-user HE-SIG fields to signal short symbol padding or a packet extension. That is, the BS or AP may signal a common packet extension duration to each of the wireless communication device(s), and each of the wireless communication device(s) may apply the same packet extension duration to the trigger-based frame.

In accordance with an embodiment, the trigger-based frame may be constructed as follows: wireless communication device(s) using a BCC error correction scheme may use MAC padding (pre-FEC) to fill all symbols; wireless communication device(s) using an LDPC error correction scheme may use MAC padding to fill all symbols except for the final symbol segment; for wireless communication device(s) using an LDPC error correction scheme, the final symbol segment for an "extra" symbol segment of parity may always be used; and/or all wireless communication device(s) may append the packet extension (e.g., 0 μs, 8 μs, or 16 μs) requested by the BS or AP.

In accordance with an embodiment, a wireless communication device is required to provide channel state information (CSI) regarding the channel properties of the communication link between the BS or AP and the wireless communication device. The CSI may be provided in response to receiving one or more certain packets from the BS or AP. For example, in accordance with an embodiment, the BS or AP may transmit an HE Null Data Packet Announcement (NDPA) frame followed by a NDP. The purpose of the NDPA is to announce to the wireless communication device that an NDP is to follow. In response to receiving the NDP, the wireless communication device may provide a feedback frame containing the CSI. In accordance with an embodiment, to meet the SIFS time, the BS or AP may provide a packet extension to the end of the NDP.

In accordance with one or more embodiments, the NDP packet extension duration supported by a wireless communication device may be signaled to the BS or AP during the association process. For example, the wireless communication device may provide an association request that includes a capability field that specifies the packet extension duration supported, for NDP packets. In accordance with an embodiment, the supported durations are 0 μs, 8 μs, or 16 μs. In accordance with such an embodiment, a 2-bit value indicating the supported packet extension duration (e.g., '00' for 0 μs, '01' for 8 μs, and '10' for 16 μs) may be provided in the capability field. In accordance with another embodiment, the supported durations are 0 μs and 8 μs. In accordance with such an embodiment, a 1-bit value indicating the supported packet extension duration (e.g., '0' for 0 μs, and '1' for 8 μs) may be provided in the capability field.

III. Further Example Embodiments

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction. Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or hardware combined with one or both of software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like (further physical storage hardware). In greater detail, examples of such computer-readable storage media include a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The automatic detection of the power status of electronic device(s) and/or the automatic control scheme of electronic device(s) embodiments and/or any further systems, subsystems, and/or components disclosed herein may be implemented in hardware (e.g., hardware logic/electrical circuitry), or hardware combined with one or both of software (computer program code configured to be executed in one or more processors or processing devices) and/or firmware.

Figure 20:
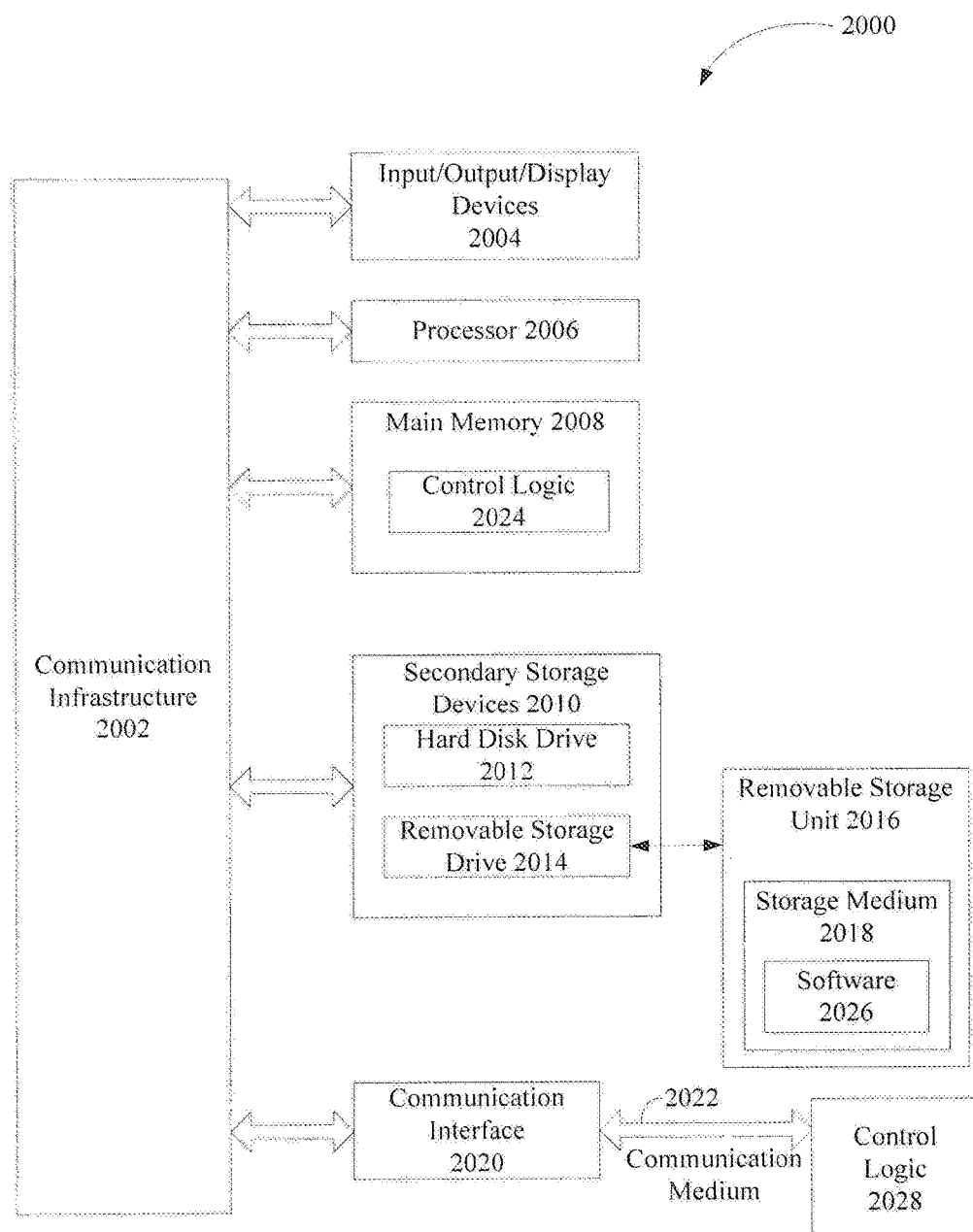
FIG. 20 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 2000 shown in FIG. 20. It should be noted that computer 2000 may represent communication devices, processing devices, servers, and/or traditional computers in one or more embodiments. For example, BS or APs 102, 104, 106, BS or AP 202, BS or AP 1402, BS or AP 1502, and/or BS or AP 1902 (as described above in reference to FIGS. 1, 2, 14, 15, and 19, respectively), wireless communication devices 108, 110, 112, 114, 116, 118, and/or 120, wireless communication device 204, wireless communication device 1404, wireless communication devices 1504 and/or 1510, and/or wireless communication device 1904 (as described above in reference to FIGS. 1, 2, 14, 15, and 19, respectively), network hardware component 122 (as described above in reference to FIG. 1), any of the subsystems, components or sub-components respectively contained therein, may be implemented using one or more computers 2000.

Computer 2000 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 2000 may be any type of computer, including a desktop computer, a server, etc.

Computer 2000 includes one or more processors (also called central processing units, or CPUs), such as a processor 2006. Processor 2006 is connected to a communication infrastructure 2002, such as a communication bus. In some embodiments, processor 2006 can simultaneously operate multiple computing threads.

Computer 2000 also includes a primary or main memory 2008, such as random access memory (RAM). Main memory 2008 has stored therein control logic 2024 (computer software), and data.

Computer 2000 also includes one or more secondary storage devices 2010. Secondary storage devices 2010 include, for example, a hard disk drive 2012 and/or a removable storage device or drive 2014, as well as other types of storage devices, such as memory cards and memory sticks. For instance, computer 2000 may include an industry standard interface, such a universal serial bus (USA) interface for interfacing with devices such as a memory stick. Removable storage drive 2014 represents a floppy disk drive, a magnetic tape drive, a compact disk drive, an optical storage device, tape backup, etc.

Removable storage drive 2014 interacts with a removable storage unit 2016, Removable storage unit 2016 includes a computer useable or readable storage medium 2018 having stored therein computer software 2026 (control logic) and/or data. Removable storage unit 2016 represents a floppy disk, magnetic tape, compact disk, DVD, optical storage disk, or any other computer data storage device. Removable storage drive 2014 reads from and/or writes to removable storage unit 2016 in a well-known manner.

Computer 2000 also includes input/output/display devices 2004, such as touchscreens, LED and LCD displays, monitors, keyboards, pointing devices, etc Computer 2000 further includes a communication or network interface 2018. Communication interface 2020 enables computer 2000 to communicate with remote devices. For example, communication interface 2020 allows computer 2000 to communicate over communication networks or mediums 2022 (representing a form of a computer useable or readable medium), such as LANs, WANs, the Internet, etc. Network interface 2020 may interface with remote sites or networks via wired or wireless connections.

Control logic 2028 may be transmitted to and from computer 2000 via the communication medium 2022.

Any apparatus or manufacture comprising a computer useable or readable medium having control logic (software) stored therein is referred to herein as a computer program product or program storage device. This includes, but is not limited to, computer 2000, main memory 2008, secondary storage devices 2010, and removable storage unit 2016. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A wireless communication device, comprising:
    one or more processors and/or circuits configured to:
        identify a final symbol of an outgoing data packet that includes a data payload;
        segment the final symbol into a plurality of short symbol segments;
        determine a last short symbol segment of the plurality of short symbol segments that includes a portion of the data payload;
        add a first padding and a second padding to the outgoing data packet based on the last short symbol segment and the portion of the data payload; and
    a transmitter configured to transmit the outgoing data packet to a receiver.

2. The wireless communication device of claim 1, wherein the one or more processors and/or circuits are further configured to add the first padding to a remainder of the last short symbol segment, wherein the remainder of the last short symbol segment does not include the portion of the data payload.

3. The wireless communication device of claim 1, wherein the one or more processors and/or circuits are further configured to add the second padding to remaining short symbol segments of the plurality of short symbol segments that follow the last short symbol segment.

4. The wireless communication device of claim 1, wherein the first padding is pre-forward error correction padding, and the second padding is post-forward error correction padding.

5. The wireless communication device of claim 4, wherein the second padding is an OFDM scrambling sequence.

6. The wireless communication device of claim 1, wherein the one or more processors and/or circuits are further configured to:
    receive a capability of the receiver, and
    determine a maximum packet extension length based on the capability.

7. The wireless communication device of claim 6, wherein the one or more processors and/or circuits are further configured to:
    determine whether the second padding is less than the maximum packet extension length;
    in response to determining that the second padding is less than the maximum packet extension length, add a packet extension to the outgoing data packet that has a length equal to the maximum packet extension length.

8. A method of generating an outgoing data packet or transmittal to a receiver, comprising:
    identifying a final symbol of the outgoing data packet, the final symbol of the outgoing data packet being a last symbol that includes a portion of a data payload;
    segmenting the final symbol into a plurality of short symbol segments;
    determining a last short symbol segment of the plurality of short symbol segments that includes the portion of the data payload;
    adding a first padding and a second padding to the outgoing data packet based on the last short symbol segment and the portion of the data payload; and
    transmitting the outgoing data packet to the receiver.

9. The method of claim 8; further comprising:
    adding the first padding to a remainder of the last short symbol segment, wherein the remainder of the last short symbol segment does not include the portion of the data payload; and
    adding the second padding to remaining short symbol segments of the plurality of short symbol segments that follow the last short symbol segment.

10. The method of claim 9, wherein the first padding is pre-forward error correction padding, and
    wherein the second padding is post-forward error correction padding.

11. The method of claim 8, further comp g;
receiving a capability of the receiver; and
determining a maximum packet extension length based on the received capability.

12. The method of claim 11, further comprising:
determining that an amount of the second padding is less than the maximum packet extension length; and
in response to the determining that the amount second padding is less than the maximum packet extension length, adding a packet extension to the outgoing data packet equal in length to a difference between the maximum packet extension length and the amount of the second padding.

13. The method of claim 12, wherein the plurality of short symbol segments includes four short symbol segments, each having a duration of 4 μs, and wherein the maximum packet extension length is 8 μs.

14. The method of claim 12, wherein the plurality of short symbol segments includes four short symbol segments, each having a duration of 4 μs, and wherein the maximum packet extension length is 16 μs.

15. A method of generating an outgoing data packet for transmittal to a receiver, comprising:
identifying a final symbol of the outgoing data packet that includes a data payload, the final symbol of the outgoing data packet being a last symbol that includes a portion of the data payload;
segmenting the final symbol into a plurality of short symbol segments;
determining a last short symbol segment of the plurality of the plurality of short symbol segments that includes the portion of the data payload;
adding a first padding and a second padding to the outgoing data packet based on the last short symbol segment and the portion of the data payload;
determining whether a packet extension to the outgoing data packet is needed based on an amount of the second padding and a property of the receiver;
adding the packet extension to the outgoing data packet based on determining the packet extension to the outgoing data packet is needed; and
transmitting the outgoing data packet to the receiver.

16. The method of claim 15, wherein the determining of whether the packet extension to the outgoing data packet is needed includes:
determining a maximum packet extension based on the property of the receiver; and
determining whether the amount of the second padding is less than the maximum packet extension.

17. The method of claim 16, wherein the property of the receiver includes a constellation threshold that defines a constellation level at which a maximum duration of packet extension supported by the receiver is changed.

18. The method of claim 15, wherein the adding of the packet extension includes:
determining a maximum packet extension based on the property of the receiver; and
calculating an amount of packet extension based on the amount of the second padding and the maximum packet extension.

19. The method of claim 18, wherein the calculating the amount of packet extension includes:
determining that the amount of the second padding is less than the maximum packet extension; and
calculating the amount of packet extension as being a difference between the maximum packet extension and the amount of the second padding.

20. The method of claim 18, wherein the amount of the second padding and the maximum packet extension are each multiple of 4 μs.

* * * * *